United States Patent
Shingai et al.

(10) Patent No.: US 10,010,868 B2
(45) Date of Patent: Jul. 3, 2018

(54) CERIA-ZIRCONIA-BASED COMPOSITE OXIDE AND METHOD OF PRODUCTION OF THE SAME

(71) Applicant: Nippon Denko Co., Ltd., Tokyo (JP)

(72) Inventors: Yasuharu Shingai, Tokushima (JP); Tomoharu Itoh, Tokushima (JP); Wataru Nagoh, Tokushima (JP)

(73) Assignee: NIPPON DENKO CO., LTD., Tokyo (JP)

(*) Notice: Subject to any disclaimer, the term of this patent is extended or adjusted under 35 U.S.C. 154(b) by 0 days.

(21) Appl. No.: 14/895,728

(22) PCT Filed: Dec. 12, 2013

(86) PCT No.: PCT/JP2013/083375
§ 371 (c)(1),
(2) Date: Dec. 3, 2015

(87) PCT Pub. No.: WO2014/196100
PCT Pub. Date: Dec. 11, 2014

(65) Prior Publication Data
US 2016/0121301 A1    May 5, 2016

(30) Foreign Application Priority Data

Jun. 4, 2013  (JP) ................................. 2013-117997

(51) Int. Cl.
*B01J 23/10* (2006.01)
*C01G 25/00* (2006.01)
(Continued)

(52) U.S. Cl.
CPC ............. *B01J 23/10* (2013.01); *B01J 35/002* (2013.01); *B01J 37/009* (2013.01);
(Continued)

(58) Field of Classification Search
CPC ........ B01J 23/10; B01J 37/06; B01J 37/0236; B01J 37/04; B01J 37/009; B01J 35/002;
(Continued)

(56) References Cited

U.S. PATENT DOCUMENTS 6,171,572 B1 * 1/2001 Aozasa ................. B01D 53/86
423/594.12
6,214,306 B1   4/2001 Aubert et al.
(Continued)

FOREIGN PATENT DOCUMENTS

JP  01270515    4/1988
JP  4-58413     9/1992
(Continued)

OTHER PUBLICATIONS

Mao, X.-B. et al, High Performance, Ce0.35Zr0.55Y0.10 1.95 Rare Earth Oxygen Storage Material, Chinese Journal of Inorganic Chemistry, Aug. 2006, vol. 22, No. 8, p. 1521-1524, ISSN:1001-4861, English-language abstract provided.

(Continued)

*Primary Examiner* — Anthony J Zimmer
(74) *Attorney, Agent, or Firm* — Hunton Andrews Kurth LLP

(57) ABSTRACT

A ceria-zirconia-based composite oxide which has a crystal phase of the composite oxide of a single solid-solution phase even after exposure to a high temperature over a long time and has a small change in mode pore diameter and in pore volume before and after a high temperature durability test is provided. This is realized by a ceria-zirconia-based composite oxide having a chemical composition, by mass ratio, of zirconia: 30% to 80%, a total of oxides of one or more elements selected from yttrium and rare earth elements having atomic number 57 to 71 (except cerium and promethium): 0% to 20%, and a balance of ceria and unavoidable (Continued)

impurities, in which ceria-zirconia-based composite oxide, the composite oxide is deemed to be a single solid-solution phase in an X-ray diffraction pattern after a durability test which heats the oxide in the atmosphere at a temperature condition of 1100° C. for 5 hours and has a ratio (b/a) of mode pore diameter (b) of a pore distribution after a durability test which heats the oxide in the atmosphere at a temperature condition of 1100° C. for 5 hours to the mode pore diameter (a) before the durability test of $1.0 \leq b/a \leq 2.0$ and/or has a ratio (d/c) of pore volume (d) after a durability test which heats the oxide in the atmosphere at a temperature condition of 1100° C. for 5 hours to the pore volume (c) before the durability test of $0.20 \leq d/c \leq 1.00$.

7 Claims, 5 Drawing Sheets

(51) Int. Cl.
*C01G 25/02* (2006.01)
*C01F 17/00* (2006.01)
*B01J 35/00* (2006.01)
*B01J 37/00* (2006.01)
*B01J 37/02* (2006.01)
*B01J 37/04* (2006.01)
*B01J 37/06* (2006.01)

(52) U.S. Cl.
CPC .......... *B01J 37/0236* (2013.01); *B01J 37/04* (2013.01); *B01J 37/06* (2013.01); *C01F 17/0043* (2013.01); *C01G 25/00* (2013.01); *C01G 25/02* (2013.01); *B01J 2523/00* (2013.01); *C01P 2002/50* (2013.01); *C01P 2002/52* (2013.01); *C01P 2002/72* (2013.01); *C01P 2006/12* (2013.01); *C01P 2006/14* (2013.01); *C01P 2006/16* (2013.01)

(58) Field of Classification Search
CPC ...... B01J 2523/00; C01G 25/02; C01G 25/00; C01F 17/0043; C01P 2002/72; C01P 2006/14; C01P 2002/52; C01P 2006/12; C01P 2002/50; C01P 2006/16
See application file for complete search history.

(56) References Cited

U.S. PATENT DOCUMENTS

| | | |
|---|---|---|
| 7,795,171 B2 | 9/2010 | Maruki et al. |
| 2006/0088463 A1 | 4/2006 | Takao et al. |
| 2012/0189517 A1 | 7/2012 | Ifrah et al. |
| 2013/0142713 A1 | 6/2013 | Ifrah et al. |
| 2014/0309104 A1 | 10/2014 | Murota et al. |

FOREIGN PATENT DOCUMENTS

| | | |
|---|---|---|
| JP | 6-293564 | 10/1994 |
| JP | 0818833 H | 2/1996 |
| JP | 2003137550 A | 5/2003 |
| JP | 3490456 B | 11/2003 |
| JP | 2004-323257 | 11/2004 |
| JP | 2005-179093 | 7/2005 |
| JP | 2005247585 A | 9/2005 |
| JP | 2005320189 A | 11/2005 |
| JP | 2006247635 A | 9/2006 |
| JP | 4053623 | 2/2008 |
| JP | 2008-150264 | 7/2008 |
| JP | 2009078202 A | 4/2009 |
| JP | 2012-533499 | 12/2012 |
| JP | 5164665 B2 | 12/2012 |
| JP | 2012533499 A | 12/2012 |
| JP | 5168527 B | 1/2013 |
| JP | 2013525255 A | 6/2013 |
| WO | 2013/073381 | 5/2013 |
| WO | 2013073381 A | 5/2013 |

OTHER PUBLICATIONS

Wang, M. et al, Preparation and Properties of Low Cerium Content Ce—Zr—Y Oxygen Storage Material with High Thermal Stability and High Specific Surface Area, Chemical Journal of Chinese Universities, May 2006, vol. 27, No. 5, p. 944-947, ISSN:0251-0790, English-language abstract provided.
Li, Y.-f. et al, A Review for the Development of Doping Modified Ceria-zirconia Solid Solutions, Chinese Rare Earths, Oct. 2009, vol. 30 No. 5, p. 78-83, ISSN:1004-0277, English-language abstract provided.
Wang, Z. et al, Advances in Oxygen Storage Materials for Automotive emission Catalyst, Sciencepaper Online, Jul. 18, 2013, [online], p. 1-8, <URL> http://www.paper.edu.cn/releasepaper/content/201307-264, English-language abstract provided.
International Search Report for International Application No. PCT/JP2013/083375, dated Mar. 18, 2014.

* cited by examiner

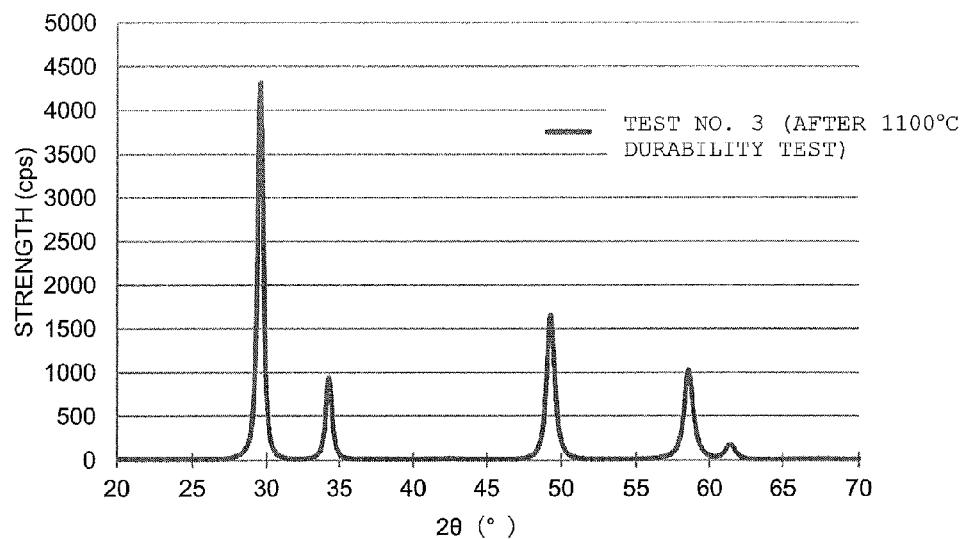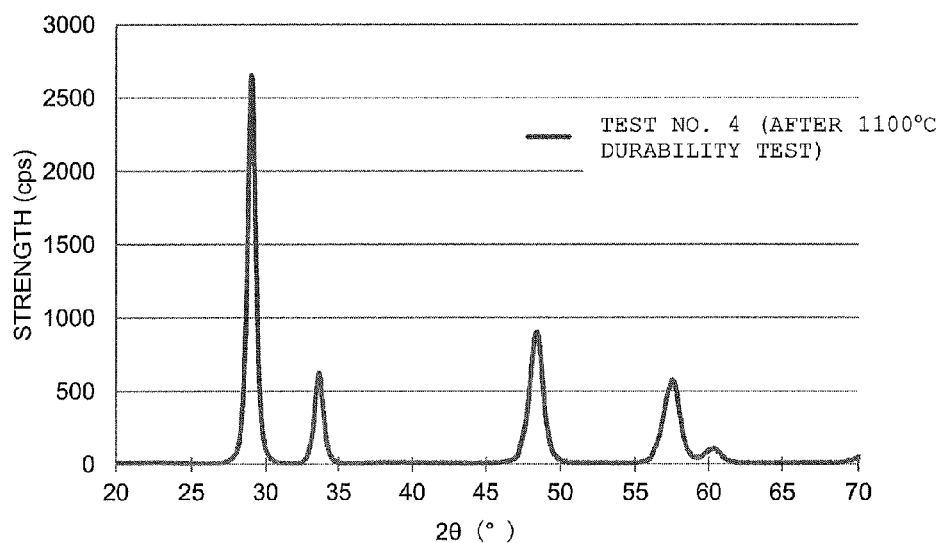

CERIA-ZIRCONIA-BASED COMPOSITE OXIDE AND METHOD OF PRODUCTION OF THE SAME

CROSS REFERENCE TO RELATED APPLICATION(S)

This application is a national stage application of International Application No. PCT/JP2013/083375, filed Dec. 12, 2013, which is incorporated herein by reference in its entirety, and which claims priority to Japanese Patent Application No. 2013-117997, filed Jun. 4, 2013.

TECHNICAL FIELD

The present invention relates to a ceria-zirconia-based composite oxide and a method of production of the same.

BACKGROUND ART

In the past, composite oxides which contain a plurality of metal oxides have been used as carriers for exhaust gas-purifying catalysts and catalytic promoters. Among these, composite oxides which contain ceria are being broadly used since ceria has an oxygen storage capacity (OSC) enabling it to absorb and release oxygen in accordance with the oxygen partial pressure. In particular, ceria-zirconia-based composite oxides are known to have excellent properties as catalytic promoters of automotive exhaust gas-purifying catalysts. Numerous proposals have been made relating to their compositions and structures and to methods of producing the same.

For example, PLT 1 discloses a method of production of zirconia powder in which a stabilizing agent is dissolved in solid state characterized by being comprised of a step of crushing zirconium hydroxide in water to form a slurry, a step of stirring the slurry while adding and mixing in an aqueous solution which contains one or more water soluble salts of yttrium, calcium, magnesium, cerium, aluminum, and other usually used zirconia stabilizing agents so as to make the majority of metal ions of the stabilizing agent be adsorbed at the zirconium hydroxide, a step of heating the treated slurry to raise it in temperature and make the amount of adsorption of the metal ions of the added stabilizing agent increase, then using ammonia water etc. to neutralize the slurry to thereby make the adsorbed metal ions of the stabilizing agent precipitate in the zirconium hydroxide, a step of making the unadsorbed remainder of the metal ions of the stabilizing agent precipitate as hydroxides on the zirconium hydroxide surface, and a step of separating the mixed precipitate of the obtained zirconium hydroxide from the aqueous solution, then calcining it.

Further, PLT 2 discloses a method of production of a zirconia-ceria-based composite oxide which comprises adding an alkali into an aqueous solution of a zirconium salt which contains 0.42 to 0.7 mole of sulfate radical ($SO_4^{2-}$) per mole of zirconium cations at up to 50° C. temperature, adding a cerium salt solution into that reaction mixture, causing the obtained mixture react to form a zirconia-ceria-based complex hydroxide, then firing this zirconia-ceria-based complex hydroxide to form a composite oxide. It discloses that, in that case, the alkali which is added into the aqueous solution of the zirconium salt is added until the pH value of the mixture becomes a pH 1 to 2 in range and, further, that the alkali which is added into the mixture is preferably added until that pH value reaches a value of a pH 8 or more.

In recent years, these ceria-zirconia-based composite oxides, considering the environments of use, have been required to have an excellent oxygen storage property after performing a durability test which heats the oxides in the atmosphere at a temperature condition of 1100° C. for 5 hours. PLT 3 describes that "it is known that the oxygen storage capacity is greatly affected by the crystal phase of the zirconia-ceria complex. By forming a solid-solution phase of zirconia-ceria, the oxygen storage capacity is remarkably improved. For this reason, to obtain a high oxygen storage and release capacity, it is desired that there be a solid solution crystal phase". Further, PLT 4 describes as the means for forming a solid solution crystal phase, "a method of production of a zirconium-containing composite oxide characterized by bringing a raw material solution which contains zirconium-containing salts and rare earth metal salts and/or alkali earth metal salts into contact with pulse combustion gas, then heat treating the result in an oxidizing atmosphere".

Further, PLT 5 (claim 5) describes a composition having a specific surface area after 6 hours of a durability test under a temperature condition of 1100° C. of 5 to 13 $m^2/g$ and having zirconium oxide and cerium oxide as base materials, while PLT 6 (claim 1) describes a zirconium-cerium-based composite oxide having a specific surface area of 20 $m^2/g$ after a 6 hour-durability test under a temperature condition of 1100° C. for 6 hours.

PLT 7 illustrates a ceria-zirconia-based composite oxide which has inclusion of a precious metal (Pt, Pd, Rh, etc.) as a requirement, wherein a ratio of a mode pore diameter of pore distribution after a durability test which fires the oxide at a temperature condition of 1050° C. for 24 hours (heats it in the atmosphere) to a mode pore diameter before the durability test is substantially equal (see FIGS. 1 and 2) and describes the specific surface area as being 20 $m^2/g$ or more.

PLT 8 describes a ceria-zirconia-based composite oxide which, though having an unknown pore distribution mode pore diameter before heating, has a mode pore diameter of pore distribution of 50 nm to 70 nm in range after heating in the atmosphere at a temperature condition of 1000° C. for 24 hours.

PLT 9 has two types of groups of pores as a requirement. Paragraphs 0093 to 0095 describe a ceria-zirconia-based composite oxide which has a mode pore diameter after calcining at 900° C. for 4 hours (heating in the atmosphere) of about 45 nm and has a mode pore diameter after calcining at 1000° C. for 4 hours (heating in the atmosphere) of about 60 nm. However, the mode pore diameter of the fired precipitate after calcining the precipitate after autoclaving in the air at 850° C. for 2 hours (=before durability test) is not described.

PLT 10 describes a ceria-zirconia-based composite oxide showing the results of measurement of the pore volume before heat treatment (fresh) (see FIG. 1) and the results of measurement of the pore volume after firing at 1000° C. for 3 hours (see FIG. 2). Further, PLT 10 describes that pores which have diameters of 10 to 100 nm hold the active species of the catalyst, that is, the precious metal, well diffused, so a large pore volume which has diameters of 10 to 100 nm is sought and describes a cerium-zirconium-based composite oxide characterized by having a pore volume which has diameters of 10 to 100 nm of 0.25 ml/g or more and a pore volume which has diameters of 10 to 100 nm after heat treatment at 1000° C. for 3 hours of 0.2 ml/g or more.

PLT 11 describes "cerium oxide II characterized by exhibiting a pore volume of at least 0.1 $cm^3/g$ measured after firing at a 800 to 900° C. temperature." It describes that the pore volume indicates the pore volume which corresponds to a 60 nm or less pore diameter and that to hold a high pore volume even after firing at 900° C., it is necessary to add a base to the cerium salt solution to form cerium hydroxide, then apply autoclaving it.

Further, PLT 12 describes a ceria-zirconia solid solution as an "oxide powder characterized by being comprised of ceria (cerium oxides), having a pore volume of pore diameters of 3.5 to 100 nm of 0.07 cc/g or more after firing at 600° C. for 5 hours, and having a pore volume of pore diameters of 3.5 to 100 nm after firing at 800° C. for 5 hours of 0.04 cc/g or more". It is described that in ceria-zirconia for a catalytic promoter of an automotive exhaust gas-purifying catalyst, it is important to have a large pore volume as the diffusion space for exhaust gas, in particular it is important to have a pore volume whose diameters are 3.5 to 100 nm in range. PLT 12 as well, in the same way as PLT 1, is characterized by the point of neutralizing an acidic solution which contains cerium nitrate (III) by a base, then heating and aging it in water to 100 to 150° C. (autoclaving) to form a 3.5 to 100 nm in range pore volume.

Further, PLT 13 describes a composite oxide which contains Ce and Zr wherein a pore volume of 0.30 cc/g or more is realized after firing in an air atmosphere at 1000° C. for 5 hours. To obtain a porous composite oxide, a pore-forming agent constituted by a surfactant is used.

Further, PLT 14 shows two groups of pores after calcining at 900° C. temperature for 4 hours and describes an oxide which contains zirconium oxide and cerium oxide characterized in that the diameters of the pores of the first group concentrate at a value between 20 and 40 nm and the diameters of the pores of the second group concentrate at a value between 80 nm and 200 nm and characterized by having a pore volume of at least 1.5 ml Hg/g after calcining at 900° C. for 4 hours.

CITATIONS LIST

Patent Publications

PLT 1: Japanese Patent Publication No. 6-293564A
PLT 2: Japanese Patent Publication No. 2003-137550A
PLT 3: Japanese Patent Publication No. 2005-247585A, Description, paragraph 0006
PLT 4: Japanese Patent Publication No. 2005-320189A
PLT 5: Japanese Patent No. 3490456B3
PLT 6: Japanese Patent No. 4053623B2
PLT 7: Japanese Patent Publication No. 2006-247635A
PLT 8: Japanese Patent Publication No. 2009-078202A
PLT 9: Japanese Patent Publication No. 2012-533499A
PLT 10: U.S. Pat. No. 7,795,171 (Japanese Patent No. 5164665B3)
PLT 11: Japanese Patent Publication No. 8-18833B2
PLT 12: Japanese Patent No. 5168527B3
PLT 13: International Publication No. 2013/073381
PLT 14: Japanese Patent Publication No. 2013-525255A

SUMMARY OF INVENTION

Technical Problem

However, the means described in PLT 1 basically relate to a method of production of zirconia powder in which a stabilizing agent constituted by yttria ($Y_2O_3$) etc. is dissolved. According to the examples, the content of yttria in the zirconia powder is only 5.4 wt % in the finished product. Further, no example in which ceria is dissolved is described either. In addition, as shown by the X-ray diffraction chart of the finished product, when calcining at 800° C., only a product which contains monoclinic crystal system crystals derived from zirconia can be produced. Further, there is no suggestion or description at all relating to one of the problems of the present application of "the importance of the ratio of mode pore diameters of pore distribution of a ceria-zirconia-based composite oxide before and after a durability test which heats the oxide in the atmosphere at a temperature condition of 1100° C. for 5 hours (high temperature durability test)". Further, another problem in the present application, that is, "the importance of change of the pore volume before and after a high temperature durability test" is also not suggested or described at all. The same problems as the present application are not recognized.

PLT 2 discloses a method of production of a zirconia.ceria-based composite oxide which is excellent in uniformity of the crystal phase. It shows that the obtained zirconia.ceria-based composite oxide forms a single crystal phase after firing at 700° C. for 4 hours and at 950° C. for 2 hours. However, as clear from the examples, this substantially only discloses a method of production of a zirconia-ceria-based composite oxide characterized by adding an alkali to an aqueous solution of a water-soluble zirconium salt which contains 0.42 to 0.7 mole of sulfate radical ($SO_4^{2-}$) per mole of zirconium cations in the presence of a water-soluble cerium salt at up to 50° C. temperature, causing them to react to form a zirconia-ceria-based complex hydroxide, next firing this zirconia-ceria-based complex hydroxide to form a composite oxide. An X-ray diffraction pattern after a durability test at 1100° C. for 5 hours (high temperature durability test) is not described at all. The importance of the change in pore volume before and after a high temperature durability test is also not suggested or described at all. Further, in the method of production of PLT 2, the cerium ions are neutralized just by adding an alkali to make the pH 8 or more, so the gaps between zirconium hydroxide particles are randomly filled by cerium hydroxide. Such a zirconia-ceria-based composite oxide which is obtained by firing a hydroxide has particles which quickly sinter at the time of heating and has a specific surface area which ends up smaller, so this is not preferable for a catalytic promoter of an automotive exhaust gas-purifying catalyst material or for an oxygen storage material, so this is not preferable.

PLTs 3 and 4 describe the importance of the zirconia-ceria composite oxide having a solid solution-based crystal phase and that method of production, but do not describe an X-ray diffraction pattern after a durability test which heats the oxide in the atmosphere at a temperature condition of 1100° C. for 5 hours (high temperature durability test). The importance of the change in pore volume before and after a high temperature durability test is also not suggested or described at all. Further, PLT 5 (claim 5) describes a composition having zirconium oxide and cerium oxide as base materials which has a specific surface area after a 6-hour durability test at a temperature condition of 1100° C. of 5 to 13 $m^2/g$, while PLT 6 (claim 1) describes a zirconium-cerium-based composite oxide with a specific surface area after a 6-hour durability test at a temperature condition of 1100° C. of 20 $m^2/g$. However, while the specific surface area after a 6-hour durability test at a temperature condition of 1100° C. is alluded, there is no suggestion or description of the ratio of mode pore diameters of pore distribution of a ceria-zirconia-based composite oxide before and after a durability test which heats the oxide in the atmosphere at a temperature condition of 1100° C. for 5 hours (high temperature durability test) such as explained later in this description. Further, the importance of the change in pore volume before and after a high temperature durability test is also not suggested or described at all. The same problems as the present application are not recognized.

PLT 7 describes dissolving, adding, and precipitating a precious metal (Pt, Pd, Rh, etc.) in zirconium-cerium, then firing to obtain a zirconium-cerium composite oxide which contains a precious metal. By adding a precious metal, it is possible to prevent sintering of the zirconium-cerium composite oxide at a high temperature to try to increase the specific surface area and increase the pore volume. It incorporates not a precious metal as an exhaust gas purification active component, but a precious metal that is a sintering preventing agent as a component of CZ (ceria-zirconia). The technical idea is completely different from the ceria-zirconia-based composite oxide of the present application which is obtained by firing without adding any precious metal at all. The chemical composition is also different. On top of this, the same problems as the present application are not recognized.

PLT 8 has as its problem (object) the addition of a trace amount of the catalyst metal Pd to a zirconium-cerium-based composite oxide to thereby maintain an excellent oxygen storage and release capacity and high catalyst activity even after exposure to high temperature gas and provides a ceria-zirconia-based composite oxide, which is obtained by dehydrating and firing a precipitate which is obtained by ammonia coprecipitation of Zr ions, Ce ions, and Pd ions. These are carried on the surfaces of the primary particles or between the primary particles of the ceria-zirconia-based composite oxide. The technical idea is completely different from the ceria-zirconia-based composite oxide of the present application which is obtained by firing without adding any Pd ions at all. The chemical composition is also different. On top of this, the same problems as the present application are not recognized.

PLT 9 describes a zirconium-cerium-based composite oxide, but has as its object the provision of a composition which achieves a good balance between a high specific surface area which is provided by the small sized pores and a good gas diffusion which is provided by the large sized pores. To achieve this object, "a composition is mainly based on cerium oxide and zirconium oxide containing at least 30 wt % cerium oxide and is characterized in that it has, after calcination at a temperature of 900° C. for 4 hours, two groups of pores, wherein the respective diameters of them are centered, in the first case, around a value of between 5 nm and 15 nm for a composition having a cerium oxide content of between 30% and 65% or a value of between 10 nm and 20 nm for a composition having a cerium oxide content of greater than 65% and, in the second case, around a value of between 45 nm and 65 nm for a composition having a cerium oxide content of between 30% and 65% or a value of between 60 nm and 100 nm for a composition having a cerium oxide content of greater than 65%" is made a requirement. For that reason, the pore diameters are divided into two groups of pores. There is a peak of pore distribution for each group of pores (becoming two peaks), but the "mode pore diameter of the pore distribution" means the mean pore diameter corresponding to the norm of the distribution, so can be calculated. However, the mode pore diameter before the durability test, that is, before calcining at a temperature of 900° C. for 4 hours (mode pore diameter after calcining at 850° C. for 2 hours as referred to in the examples of PLT 9) is not described. There is no suggestion or description at all relating to a ratio of mode pore diameters of pore distribution of a ceria-zirconia-based composite oxide before and after a durability test which heats the oxide in the atmosphere at a temperature condition of 1100° C. for 5 hours (high temperature durability test) such as explained later in this Description. Further, the importance of the change of pore volume before and after the high temperature durability test is not suggested or described at all. The same issues as the present application are not recognized.

PLT 10 describes firing at 1000° C. for 3 hours after calcining at 600° C. for 5 hours (fresh). There is no description relating to a mean pore volume and Log differential pore volume the same as FIG. 3 of the figures of the present application and no description relating to the pore distribution after a 1100° C. 5-hour durability test. Further, PLT 10 describes the importance of a pore volume which has 10 to 100 nm diameters, but the importance of a small change in the 10 to 100 nm pore volume before and after a 1100° C. durability test is not suggested or described at all. There is also no suggestion or description at all regarding the ratio of the mode pore diameters of pore distribution of a ceria-zirconia-based composite oxide before and after a durability test which heats the oxide in the atmosphere at a temperature condition of 1100° C. for 5 hours (high temperature durability test). The same problems as the present application are not recognized. Further, this is a process including autoclaving. This is uneconomical from the viewpoint of manufacturing costs.

PLT 11 is not an invention relating to ceria-zirconia for a catalytic promoter of an automotive exhaust gas-purifying catalyst, but, for example, is an invention which relates to cerium oxide which is used for a platinum catalyst carrier for synthesis of methanol. Further, even if looking at the examples, after firing at 800° C., the pore volume at the highest is only 0.23 cm$^3$/g.

Further, PLT 12 alludes to ceria-zirconia as a catalytic promoter of an automotive exhaust gas-purifying catalyst, but even if looking at the examples, after firing at 900° C., the pore volume only becomes, even at the largest, 0.073 cc/g.

Further, PLTs 11 and 12 allude to the importance of the pore volume, but the importance of the change of the pore volume before and after the high temperature durability test is not suggested or described at all. There is also no suggestion or description at all regarding the ratio of the mode pore diameters of pore distribution of a ceria-zirconia-based composite oxide before and after a durability test which heats the oxide in the atmosphere at a temperature condition of 1100° C. for 5 hours (high temperature durability test). The same problems as the present application are not recognized (described below). A catalytic promoter of an automotive exhaust gas-purifying catalyst is exposed to high temperature exhaust gas, so a small change in the pore volume before and after a high temperature durability test is preferable from the viewpoint of maintaining the purifying performance. As a durability condition, a small change even under conditions of a durability test at 1100° C. for 5 hours is preferable if the fall in the pore volume is small, the reduction in the exhaust gas diffusion space is small and the fall in the catalytic activity also becomes smaller.

Further, both PLTs 11 and 12 use nitric acid-based materials. Nitrogen discharge regulations require treatment of the nitric acid ions. Further, to form the required pore volume, aging by an autoclave apparatus is required. This is uneconomical.

PLT 13 describes that to increase the pore volume, it is necessary to add a pore forming agent constituted by a surfactant and that, if further looking at the examples, to use a nitrate. This is uneconomical. Further, the importance of the pore volume is alluded to, but the importance of the change in pore volume before and after a high temperature durability test is not suggested or described at all. There is also no suggestion or description at all regarding the ratio of the mode pore diameters of pore distribution of a ceria-zirconia-based composite oxide before and after a durability test which heats the oxide in the atmosphere at a temperature condition of 1100° C. for 5 hours (high temperature durability test). The same problems as the present application are not recognized.

PLT 14 alludes to the pore volume after calcining at 1100° C. for 4 hours and states that after calcining at 1100° C. for 4 hours, there is a pore volume at least 0.9 ml Hg/g. However, what is described is the pore volume and not the pore volume in a range of pore diameter of 5.5 to 100 nm. That is, further, the importance of the pore volume is alluded to, but the importance of the change in pore volume in a range of pore diameter of 5.5 to 100 nm before and after a high temperature durability test is not suggested or described at all. There is also no suggestion or description at all regarding the ratio of the mode pore diameters of pore distribution of a ceria-zirconia-based composite oxide before and after a durability test which heats the oxide in the atmosphere at a temperature condition of 1100° C. for 5 hours (high temperature durability test). The same problems as the present application are not recognized. Further, a surfactant is used. If further looking at the examples, actually nitric acid-based materials are used, so this is uneconomical cost-wise.

The present invention was made in consideration of the problems in the prior art and has as its object the provision of a ceria-zirconia-based composite oxide which is more fully higher in heat resistance compared with a conventional ceria-zirconia-based composite oxide, has a crystal phase of the composite oxide of a single solid-solution phase even after exposure to a high temperature over a long time, and has a small change in mode pore diameter before and after a high temperature durability test, and a method of production of the same.

Further, another object of the present invention has as its object the provision of a ceria-zirconia-based composite oxide which is more fully higher in heat resistance compared with a conventional ceria-zirconia-based composite oxide, has a crystal phase of the composite oxide of a single solid-solution phase even after exposure to a high temperature over a long time, and has a small change in pore volume before and after a high temperature durability test, and a method of production of the same.

Furthermore, still another object of the present invention is to provide a method of production of a ceria-zirconia-based composite oxide which has a crystal phase of the composite oxide of a single solid-solution phase even after exposure to a high temperature over a long time, and/or has a small change in pore volume before and after a high temperature durability test, wherein the method does not use a nitric acid-based material like in the prior art, which does not perform autoclaving, and which does not use a surfactant, but makes the heat resistance more fully higher compared with a conventional ceria-zirconia-based composite oxide.

Solution to Problem

The ceria-zirconia—(simply abbreviated as "CZ" as well) based composite oxide and the method of production of the same according to this invention can be realized by the following constitutions:

(1) A ceria-zirconia-based composite oxide having a chemical composition, by mass ratio, of zirconia: 30% to 80%, a total of oxides of one or more elements selected from yttrium and rare earth elements having atomic number 57 to 71 (except cerium and promethium): 0% to 20%, and a balance of ceria and unavoidable impurities, said composite oxide being deemed to be a single solid-solution phase in an X-ray diffraction pattern after a durability test which heats the oxide in an atmosphere at a temperature condition of 1100° C. for 5 hours, wherein a ratio (b/a) of a mode pore diameter (b) of a pore distribution after the durability test which heats the oxide in the atmosphere at the temperature condition of 1100° C. for 5 hours to a mode pore diameter (a) before the durability test is 1.0≤b/a≤2.0.

(2) A CZ-based composite oxide having a chemical composition, by mass ratio, of zirconia: 30% to 80%, a total of oxides of one or more elements selected from yttrium and rare earth elements having atomic number 57 to 71 (except cerium and promethium): 0% to 20%, and a balance of ceria and unavoidable impurities, said composite oxide being deemed to be a single solid-solution phase in an X-ray diffraction pattern after a durability test which heats the oxide in an atmosphere at a temperature condition of 1100° C. for 5 hours, wherein a ratio (d/c) of a pore volume (d) after a durability test which heats the oxide in the atmosphere at a temperature condition of 1100° C. for 5 hours to a pore volume (c) before the durability test is 0.20≤d/c≤1.00.

(3) The ceria-zirconia-based composite oxide according to (1) or (2), wherein the ratio (b/a) of the mode pore diameter (b) of a pore distribution after the durability test which heats the oxide in the atmosphere at the temperature condition of 1100° C. for 5 hours to the mode pore diameter (a) before the durability test is 1.0≤(b/a)≤2.0 and the ratio (d/c) of pore volume (d) after the durability test to the pore volume (c) before the durability test is 0.20≤d/c≤1.00.

(4) The ceria-zirconia-based composite oxide according to any one of (1) to (3), wherein the mode pore diameter (b) of the pore distribution after a durability test which heats the oxide in the atmosphere at the temperature condition of 1100° C. for 5 hours and the mode pore diameter (a) before the durability test are both 6 nm to 300 nm in range.

(5) The ceria-zirconia-based composite oxide according to any one of (1) to (4), wherein the pore volume (d) after the durability test which heats the oxide in the atmosphere at the temperature condition of 1100° C. for 5 hours is 0.10 ml/g or more and the pore volume (c) before the durability test is 0.20 ml/g or more in range.

(6) The ceria-zirconia-based composite oxide according to any one of (1) to (5), wherein a BET specific surface area after the durability test which heats the oxide in the atmosphere at the temperature condition of 1100° C. for 5 hours is 20 m²/g or more.

(7) A method of production of a ceria-zirconia-based composite oxide according to any one of (1) to (6) which comprises a first step of obtaining a zirconium hydroxide slurry which is dispersed in water, which is adjusted in pH of 1 to 12, and which is adjusted in temperature of 0° C. to 100° C., a second step of adding to and mixing with the zirconium hydroxide slurry which was obtained at the first step an acidic solution which contains cerium ions so that a chemical composition of the CZ-based composite oxide from which a finished product is formed comprises, by mass ratio, zirconia: 30% to 80%, a total of oxides of one or more third elements selected from yttrium and rare earth elements having atomic number 57 to 71 (except cerium and promethium): 0% to 20%, and a balance of ceria and unavoidable impurities while adjusting a reaction system from 4 to 8 and a temperature of the reaction system from 0° C. to 100° C., to obtain a zirconium hydroxide slurry to which cerium ions and third element ions are adsorbed, a third step, after the second step, of further adding to the zirconium hydroxide slurry to which cerium ions and third element ions are adsorbed an alkali to make the pH rise to over 8 to 12 so as to immobilize the cerium ions and third element ions which are adsorbed at the zirconium hydroxide as hydroxides and so as to make cerium ions and third element ions unabsorbed at the zirconium hydroxide at the second step precipitate as hydroxides to obtain a mixed slurry of cerium-zirconium-based hydroxides, a fourth step of filtering and washing the cerium-zirconium-based hydroxide mixed slurry which was obtained at the third step to obtain a cerium-zirconium-based hydroxide cake, and a fifth step of drying, then firing the cerium-zirconium-based hydroxide cake which was obtained at the fourth step to obtain a CZ-based composite oxide.

(8) The method of production of a ceria-zirconia-based composite oxide according to (7), further comprising, before the first step, a step of adding an alkali to a precipitation so as to obtain the zirconium hydroxide after forming the precipitation in a hydrochloric acid solution containing zirconium oxychloride using a peroxodisulfate or a sulfate.

(9) The method of production of a ceria-zirconia-based composite oxide according to (7) or (8) wherein the zirconium hydroxide slurry at the first step contains, 40% or less of the cerium ions and third element ions which are added at the second step, converted to content of oxides in the CZ-based composite oxide forming the finished product, by mass ratio, as their hydroxides.

Advantageous Effects of Invention

According to the CZ-based composite oxide of the present invention, even after a high temperature durability test, the crystal phase of the composite oxide is a single solid-solution phase and the change in the mode pore diameter before and after a high temperature durability test is small and/or a change of a pore volume before and after a high temperature durability test is small, so compared with a conventional CZ-based composite oxide, it is possible to obtain the special effects of the heat resistance being more sufficiently high and the drop in catalyst performing being small. As a result, it is possible to provide a CZ-based composite oxide which enables much better use as an automotive exhaust gas-purifying catalytic promoter than a conventional CZ-based composite oxide.

Further, according to the method of production of a CZ-based composite oxide of the present invention, it is possible to provide a method of production of a CZ-based composite oxide which can produce a ceria-zirconia-based composite oxide which has the above properties without using a nitric acid-based material or surfactant etc. like in the prior art and without autoclaving, by a lower cost than the conventional method of production of a CZ-based composite oxide and which enables more suitable use as an automotive exhaust gas purification catalytic promoter.

BRIEF DESCRIPTION OF DRAWINGS

FIG. 5 is an XRD chart of 2θ:20° to 70° of a CZ-based composite oxide according to Test No. 3 of Example 1-2 (invention example) after a durability test which heats the oxide at 1100° C. for 5 hours.

FIG. 6 is an XRD chart from 2θ:20° to 70° of a CZ-based composite oxide according to Test No. 4 of Example 1-2 (invention example) after a durability test which heats the oxide at 1100° C. for 5 hours.

DESCRIPTION OF EMBODIMENTS

Figure 1:
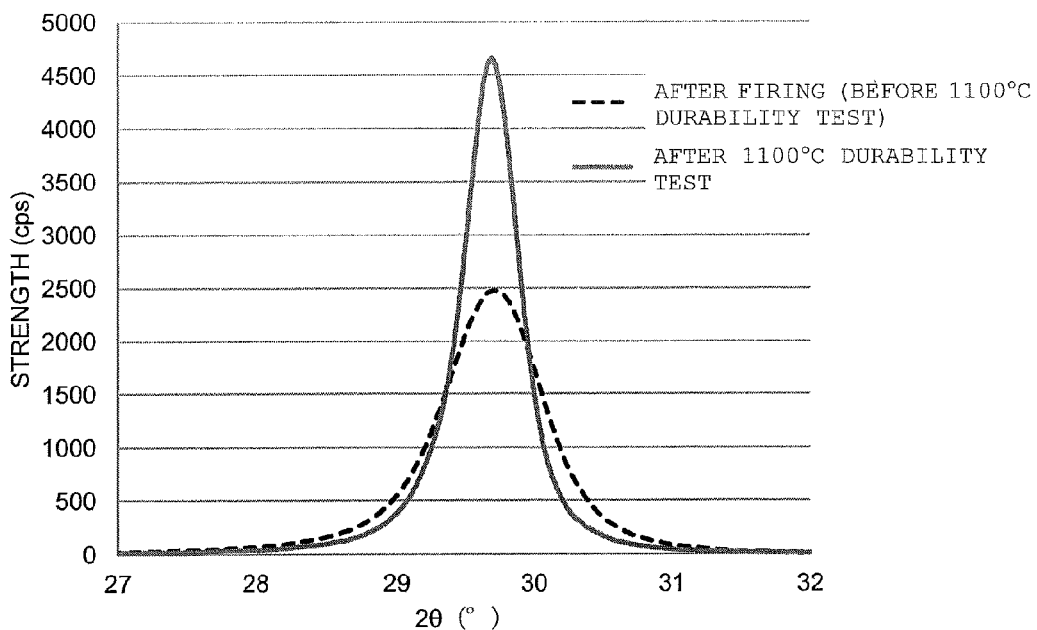
FIG. 1 is a chart of XRD from 2θ:27° to 32° of a CZ-based composite oxide according to Test No. 1 (invention example) of Example 1-1. The solid line is the chart after a durability test which heats the oxide at 1100° C. for 5 hours, while the broken line is the chart after firing at 700° C. (before 1100° C. durability test).

Below, the present invention will be explained in detail based on preferred embodiments.

The ceria-zirconia-based composite oxide of the present invention is a ceria-zirconia-based composite oxide having a chemical composition, by mass ratio, of zirconia: 30% to 80%, a total of oxides of one or more third elements selected from yttrium and rare earth elements having atomic number 57 to 71 (except cerium and promethium): 0% to 20%, and a balance of ceria and unavoidable impurities, wherein the composite oxide is deemed to be a single solid-solution phase in an X-ray diffraction pattern after a durability test which heats the oxide in the atmosphere at a temperature condition of 1100° C. for 5 hours and has a ratio (b/a) of mode pore diameter (b) of a pore distribution after a durability test which heats the oxide in the atmosphere at a temperature condition of 1100° C. for 5 hours to the mode pore diameter (a) before the durability test of 1.0≤b/a≤2.0 and/or has a ratio (d/c) of pore volume (d) after a durability test which heats the oxide in the atmosphere at a temperature condition of 1100° C. for 5 hours to the pore volume (c) before the durability test of 0.20≤d/c≤1.00. By having such a constitution, the above function and effect can be effectively realized. Note that, the CZ-based composite oxide according to the present invention relates to the finished product (for example, catalytic promoter of automotive exhaust gas catalyst etc.) of a CZ-based composite oxide. A CZ-based composite oxide before a durability test which heats the oxide in the atmosphere at a temperature condition of 1100° C. for 5 hours is covered. When using this (finished product) for a durability test for the purpose of evaluating this (finished product) for its characteristics, the subject which is covered by present invention is a finished product which is provided with the features enabling these characteristics to be effectively realized. A composite oxide after the durability test (made to degraded on an accelerated basis) is not covered by the present invention. This point should be kept in mind.

The CZ-based composite oxide of the present invention has a ratio of composition set so that it is a single solid-solution phase in an X-ray diffraction pattern after a durability test which heats the oxide in the atmosphere at a temperature condition of 1100° C. for 5 hours and so as to satisfy the characteristic values which are required for a finished product (for example, catalytic promoter of automotive exhaust gas catalyst) of a CZ-based composite oxide, in particular the oxygen storage and release capacity (OSC) value which raises the activity of the catalyst at a low temperature. Specifically, the composition should be made one which comprises, by mass ratio, zirconia: 30% to 80%, a total of oxides of one or more third elements selected from yttrium and rare earth elements having atomic number 57 to 71 (except cerium and promethium): 0% to 20%, and a balance of ceria and unavoidable impurities.

In this case, zirconia may be made 30% to 80% in range by mass ratio. Note that, if zirconia is less than 30% by mass ratio, the sintering preventing effect of ceria by zirconia decreases and the decrease in the effective surface area of the ceria at the time of the durability test advances more easily. On this point, this is not preferable. On the other hand, if the zirconia exceeds 80% by mass ratio, the amount of ceria which has an OSC (oxygen storage capacity) becomes smaller, so this is not preferable.

Further, ceria may be made 10% to 70% in range by mass ratio. Note that, when ceria is less than 10% by mass ratio, the amount of ceria which has the OSC becomes smaller, so this is not preferred. On the other hand, if ceria exceeds 70% by mass ratio, the amount of zirconia becomes smaller, the sintering preventing effect of ceria by zirconia decreases, and the decrease in the effective surface area of the ceria at the time of the durability test advances more easily. On this point, this is not preferable.

The CZ-based composite oxide of the present invention, in this way, may contain one or more types of oxides of one or more third elements which are selected from yttrium and rare earth elements having atomic number 57 to 71 (except cerium and promethium). These rare earth elements are made to be contained as so-called "third components". The selected additive elements and amounts may be determined from the viewpoints of the specific surface area after heating, the solid solution degree, the interaction with the precious metal which is carried, etc. Yttrium, lanthanum, neodymium, praseodymium, gadolinium, etc. are preferable. The total of the amounts of these third elements need only be made 0% to 20% converted to the mass ratio of oxides forming the finished product CZ-based composite oxide, from the viewpoint of including a third element as a reinforcing component for improving the function of the ceria-zirconia, is preferably 0% to 15%, more preferably 0% to 10% in range. Note that, if the total of the oxides of third elements exceeds 20% by mass ratio, the ratio of the ceria and zirconia of the basic components of the ceria-zirconia composite oxide becomes smaller. On this point, this is not preferable. Note that, even if the oxides of third elements are not contained, the function and effect of the present invention can be effectively realized, so the lower limit is 0%.

Figure 4:
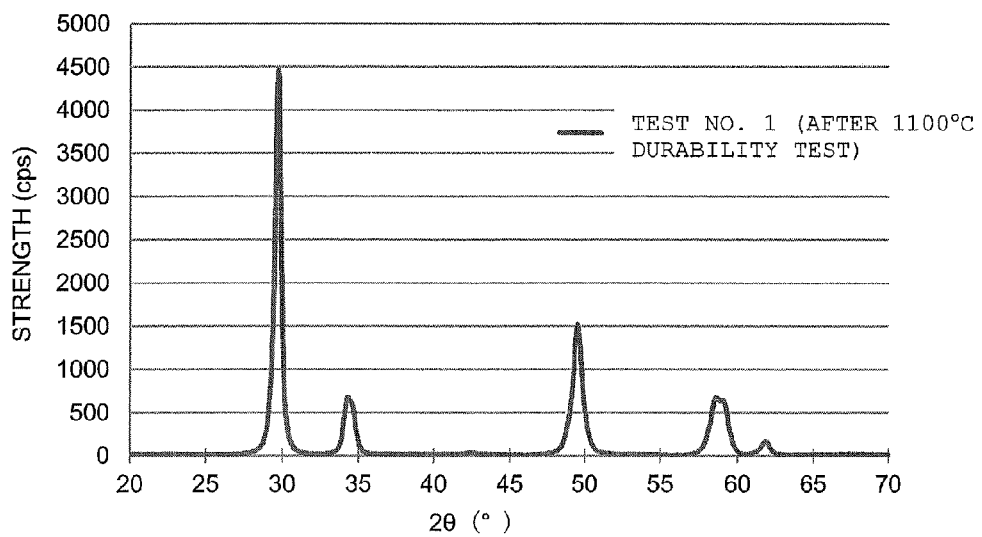
FIG. 4 is an XRD chart of 2θ:20° to 70° of a CZ-based composite oxide according to Test No. 1 of Example 1-1 (invention example) after a durability test which heats the oxide at 1100° C. for 5 hours.

The CZ-based composite oxide of the present invention, as explained above, is recognized to be a single solid-solution phase in the X-ray diffraction pattern after a durability test which heats the oxide in the atmosphere at a temperature condition of 1100° C. for 5 hours. The crystal phase can be determined by the usual X-ray diffraction (XRD) measurement. In the diffraction pattern, it is deemed that there is a single solid-solution phase when no separate phases are recognized. Here, the "single solid-solution phase" means a state where only one peak of a solution solution phase of the CZ-based composite oxide is recognized and no peaks of ceria and zirconia other than the solid-solution phase are recognized in the diffraction pattern using special X-rays (CuKα) as shown in FIG. 1 between the diffraction angles 2θ:27° to 32°. By making such a single solid-solution phase, the oxygen storage and release capacity can be raised, so the oxide can be suitably used as a catalytic promoter of an automotive exhaust gas-purifying catalyst. Note that, a broad range of XRD charts (2θ:20° to 70°) of CZ-based composite oxides after a durability test which heats the oxide at 1100° C. for 5 hours (Test Nos. 1, 3, and 4 of examples) are shown in FIGS. 4 to 6.

The CZ-based composite oxide of the present invention is characterized in that a ratio (b/a) of a mode pore diameter (b) of pore distribution after a durability test which heats the oxide in the atmosphere at a temperature condition of 1100° C. for 5 hours to a mode pore diameter (a) before the durability test is 1.0≤(b/a)≤2.0. This ratio (b/a) of mode pore diameters is preferably 1.0≤(b/a)≤1.5, more preferably 1.0≤(b/a)≤1.3. This reason is that exhaust gas is purified when passing through a separate catalyst constituted by a CZ-based composite oxide on which a precious metal is carried after firing the CZ, so a CZ-based composite oxide having a smaller change of pore diameter after a durability test when being compared with the pore diameter before the durability test enables the purifying performance of before the durability test to be easily maintained and therefore is advantageous for exhaust gas purification. However, on the other hand, making the ratio (b/a) of mode pore diameters less than 1.0 is uneconomical both technically and cost-wise, so this is not preferable. Further, the ratio (b/a) of mode pore diameters exceeding 2.0 means the pore diameter becomes remarkably coarser after the durability test when the pore diameter being compared with before the durability test and the state of passage of exhaust gas greatly changes, so this is not preferable from the viewpoint of maintaining the exhaust gas purifying performance. Here, the "mode pore diameter of pore distribution" means the mean pore diameter (average pore diameter) corresponding to the norm in distribution in the distribution chart of the Log differential pore volume (Log differential intrusion) for the mean pore diameters (mean diameter: Dm) in the different sections obtained from measurement by a mercury porosimeter. For example, it means the mean pore diameter which shows the peak top of the Log differential pore volume of FIG. 3 (if after firing at 700° C., 36 nm, while if after the 1100° C. durability test, 46 nm). Both of the mode pore diameters (a), (b) of the pore distribution are in the range of several nm to several hundred nm that is important to exhaust gas purification (removal of nitrogen oxides, carbon monoxide, and hydrocarbon molecules), specifically, 6 to 300 nm, preferably 6 to 100 nm in range. In particular, the mode pore diameter (a) of the pore distribution before the durability test is more preferably 10 to 70 nm in range from the viewpoint of improvement of the exhaust gas purifying performance. Further, the mode pore diameter (b) of pore distribution after a durability test being 20 to 90 nm in range is more preferable from the viewpoint of improvement of the exhaust gas purifying performance.

Note that, the mean pore diameter Dm in the present invention is calculated from the pore diameter D which is calculated using a mercury porosimeter (Micromeritics Autopore IV9510) from the formula of Washburn under a surface tension γ of mercury: 485 dyn/cm and a contact angle θ of the mercury and pore walls: 130°. The formula of Washburn is PD=−4γ cos θ. The i-th mean pore diameter Dmi is Dmi=(Di+Di−1)/2. Here, P is the pressure, while Di is the i-th mean pore diameter. The measurement can be performed based on an instruction manual issued by Shimadzu Corporation "Micromeritics Auto Porosimeter Autopore IV9500 Series (Windows® V1.0)". Based on the relationship of the cumulative pore volume and the pore diameter, the relationship between the Log differential pore volume and mean pore diameter is derived. The pore volumes (c) and (d) are found from the data on the relationship between the cumulative pore volume and pore diameter, while the mode pore diameters (a) and (b) are found from the data on the relationship of the Log differential pore volume and the mean pore diameter.

The CZ-based composite oxide of the present invention is characterized by having a ratio (d/c) of the pore volume (d) after a durability test which heats the oxide in the atmosphere at a temperature condition of 1100° C. for 5 hours with respect to the pore volume (c) before the durability test of 0.20≤d/c≤1.00. This ratio (d/c) of pore volumes is preferably 0.35≤(d/c)≤1.00. Further, 0.50≤(d/c)≤1.00 is more preferable. The reason is that the pore volume is the volume of the diffusion space of the exhaust gas. The exhaust gas is purified when passing through the diffusion space of the catalytic promoter (CZ-based composite oxide) on which the precious metal is carried, so a CZ-based composite oxide with a large pore volume and, further, with a small change in pore volume after the durability test compared with before the durability test enables the purifying performance of before the durability test to be maintained more easily. This is advantageous for exhaust gas purification. That is, the smaller the change before and after a durability test the better. The close the ratio (d/c) of the pore volumes to 1 the better, but over 1.00 means the pore volume after the durability test has increased when being compared with before the durability test. This is uneconomical both technically and cost-wise, so this is not preferable. On the other hand, if the ratio (d/c) of the pore volumes is less than 0.20, this means that the pore volume has remarkably dropped, that is, the exhaust gas diffusion space has remarkably dropped. The precious metal which is carried at such a CZ-based composite oxide easily becomes coarser along with the drop in the pore volume and the crushing of the pores due to sintering. This is disadvantageous for exhaust gas purification.

Figure 8:
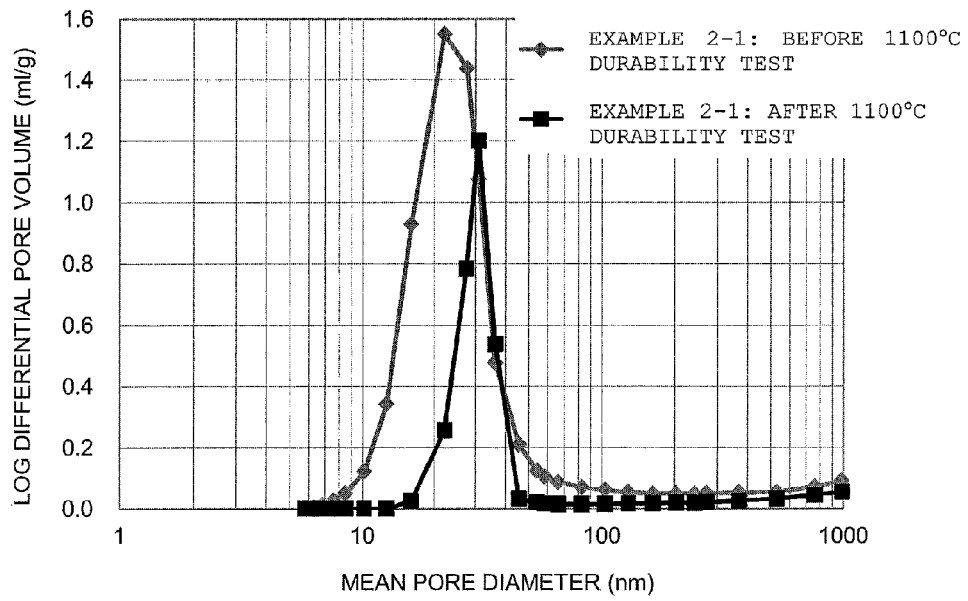
FIG. 8 is a graph which shows the relationship of a mean pore diameter and a Log differential pore volume of a CZ-based composite oxide of Example 2-1 before and after a durability test which heats the oxide at a temperature condition of 1100° C. for 5 hours.
Figure 9:
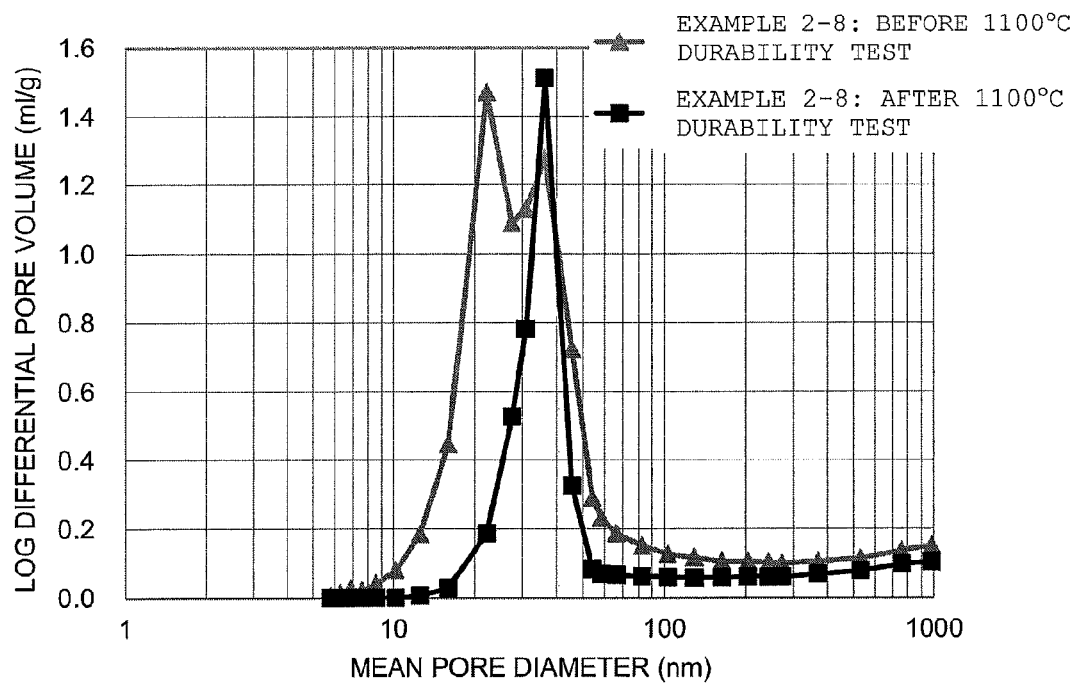
FIG. 9 is a graph which shows the relationship of a mean pore diameter and a Log differential pore volume of a CZ-based composite oxide of Example 2-8 before and after a durability test which heats the oxide at a temperature condition of 1100° C. for 5 hours.

Note that, the "pore volumes (c), (d)" referred to here both mean the pore volumes corresponding to pore diameters of 5.5 to 100 nm in range which were measured using a mercury porosimeter. The pore diameter D in the present invention is calculated using a mercury porosimeter (Micromeritics Autopore IV9510) under conditions of a surface tension γ of mercury: 485 dyn/cm and a contact angle θ of the mercury and pore walls: 130° from the formula of Washburn. The formula of Washburn is PD=−4γ cos θ, where P is the pressure. The measurement can be performed based on the instruction manual issued by Shimadzu Corporation "Micromeritics Auto Porosimeter Autopore IV9500 Series (Windows® V1.0)". The pore distribution of the CZ-based composite oxide in the present invention differs from the one of PLT 14 which shows two groups of pores after calcining and wherein the diameters of the pores concentrate at a value between 20 and 40 nm for the first group and concentrate at a value between 80 nm and 200 nm for the second group. For example, as shown in FIG. 8, a case having a single local maximum value in a mean pore diameter 6 to 300 nm in range is a typical example; but if the mass % of ceria falls to 20% or so, sometimes, as shown in FIG. 9, after firing, the local maximum value will be split into two locations in a mean pore diameter 6 to 300 nm in range. In both cases, the pores are different from PLT 14 (the "mean pore diameters" which take the local maximum value in the 1100° C. durability test of FIG. 9 are 22 nm and 36 nm, differing from PLT 14). So long as the pore diameter is 100 nm or less and there is a sufficient pore volume, there is no need for pores such as in PLT 14. A sufficient effect is obtained as a catalytic promoter of the exhaust gas-purifying catalyst. Further, the CZ-based composite oxide of the present invention (finished product) shows a high value of the BET specific surface area of 20 m$^2$/g or more even after a durability test which heats the oxide in the atmosphere at a temperature condition of 1100° C. for 5 hours and is useful as a catalytic promoter of the exhaust gas-purifying catalyst. Further, the CZ-based composite oxide of the present invention is characterized by a small change in pore volume at a pore diameter of 5.5 to 100 nm in range even after a durability test at a high temperature which heats the oxide in the atmosphere under a temperature condition of 1100° C. for 5 hours, so more preferably this can be used as an exhaust gas purification catalytic promoter.

Further, it can be said that the CZ-based composite oxide of the present invention preferably has a ratio (b/a) of a mode pore diameter (b) of pore distribution after a durability test which heats the oxide in the atmosphere at a temperature condition of 1100° C. for 5 hours to a mode pore diameter (a) before the durability test of 1.0≤b/a≤2.0 and has a ratio (d/c) of the pore volume (d) after the durability test to the pore volume (c) before the durability test of 0.20≤d/c≤1.00. Due to this, characteristics excellent in both (function and effect) can be effectively realized.

The CZ-based composite oxide of the present invention preferably has a pore value (d) after a durability test which heats the oxide in the atmosphere at a temperature condition of 1100° C. for 5 hours of preferably 0.10 ml/g or more, more preferably 0.10 to 0.50 ml/g, still more preferably 0.20 to 0.50 ml/g in range and has a pore volume (c) before the durability test of preferably 0.20 ml/g or more in range, more preferably 0.20 to 1.00 ml/g, still more preferably 0.40 to 1.00 ml/g in range. Even the pore volume (c) before a durability test which heats the oxide at a temperature condition of 1100° C. for 5 hours is 0.20 ml/g or more, the pore volume (d) after a durability test which heats the oxide at a temperature condition of 1100° C. for 5 hours is 0.10 ml/g or more, that is, the oxide has a large pore volume as an exhaust gas diffusion space. By this, it is possible to effectively realize excellent characteristics as a catalytic promoter of an automotive exhaust gas-purifying catalyst. The oxide is excellent on this point.

The CZ-based composite oxide of the present invention preferably has a BET specific surface area after a durability test which heats the oxide in the atmosphere at a temperature condition of 1100° C. for 5 hours of 20 m$^2$/g or more. If the BET specific surface area after the durability test is 20 m$^2$/g or more, the effective area of the CZ-based composite oxide does not become smaller and the oxide can be utilized well as an oxygen storage material. For that reason, this also becomes extremely useful as a catalytic promoter of an exhaust gas-purifying catalyst. The oxide is excellent on this point. Note that, the BET specific surface area can be measured by the nitrogen gas adsorption method.

The method of production of a CZ-based composite oxide of the present invention is characterized by successively performing the following first step to fifth step.

The method of production of a CZ-based composite oxide of the present invention comprises a first step of obtaining a zirconium hydroxide slurry which is dispersed in water, which is adjusted in pH of 1 to 12, and which is adjusted in temperature of 0° C. to 100° C., a second step of adding to and mixing with the zirconium hydroxide slurry which is obtained at the first step an acidic solution containing cerium ions so that a chemical composition of the CZ-based composite oxide which forms the finished product comprises, by mass ratio, zirconia: 30% to 80%, a total of oxides of one or more third elements selected from yttrium and rare earth elements having atomic number 57 to 71 (except cerium and promethium): 0% to 20%, and a balance of ceria and unavoidable impurities while adjusting the reaction system to a pH of 4 to 8 and a temperature of 0° C. to 100° C. to obtain a zirconium hydroxide slurry to which cerium ions and third element ions are adsorbed, a third step, after the second step, of further adding to the zirconium hydroxide slurry to which cerium ions and third element ions are adsorbed an alkali to make the pH rise to over 8 to 12 so as to immobilize the cerium ions and third element ions which are adsorbed at the zirconium hydroxide as hydroxides and so as to make cerium ions and third element ions unabsorbed at the zirconium hydroxide at the second step precipitate as hydroxides to obtain a mixed slurry of cerium-zirconium-based hydroxides, a fourth step of filtering and washing the mixed slurry of cerium-zirconium-based hydroxides which is obtained at the third step to obtain a cerium-zirconium-based hydroxide cake, and a fifth step of drying, then firing the cerium-zirconium-based hydroxide cake which is obtained at the fourth step to obtain a CZ composite oxide.

In particular, the method of production of a CZ-based composite oxide of the present invention desirably further comprises, before the first step, a step of causing precipitation by adding peroxodisulfate or sulfate to a hydrochloric acid solution containing zirconium oxychloride and then adding an alkali to it to obtain zirconium hydroxide (also referred to as zirconium hydroxide forming step). This is because this is an extremely efficient and effective method (means) in obtaining, among the CZ-based composite oxides of the present invention, a CZ-based composite oxide having a chemical composition, by mass ratio, of zirconia: 30% to 80%, a total of oxides of one or more elements selected from yttrium and rare earth elements having atomic number 57 to 71 (except cerium and promethium): 0% to 20%, and a balance of ceria and unavoidable impurities, wherein the composite oxide is deemed to be a single solid-solution phase in an X-ray diffraction pattern after a durability test which heats the oxide in the atmosphere at a temperature condition of 1100° C. for 5 hours and has a ratio (d/c) of pore volume (d) after a durability test which heats the oxide in the atmosphere at a temperature condition of 1100° C. for 5 hours to the pore volume (c) before the durability test of $0.20 \leq d/c \leq 1.00$.

First, at the first step, a zirconium hydroxide slurry which is dispersed in water, which is adjusted in pH of 1 to 12, and which is adjusted to a temperature (liquid temperature; slurry temperature) of 0° C. to 100° C. is obtained. This zirconium hydroxide slurry has to have a pH made a range in which the zirconium hydroxide is not dissolve. Further, there is no need to add an uneconomical amount of alkali. From this viewpoint, the pH is preferably adjusted to 1 to 12, preferably 8 to 12 in range. Such a slurry, for example, can be obtained by neutralizing an aqueous solution of a water-soluble zirconium compound, for example, zirconium oxychloride, or, for example, a slurry which contains a basic zirconium sulfate precipitate which is prepared by the process which is described in Japanese Patent Publication No. 4-58413B, by ammonia water or another alkali solution to obtain zirconium hydroxide precipitate, filtering and washing this, and repeating this to obtain zirconium hydroxide with few impurities, and dispersing the zirconium hydroxide in a suitable quantity of water to render it a slurry state. Note that, the amount of water which is added at this time may be an amount sufficient for the zirconium hydroxide to form a slurry.

Here, as the alkali solution, in addition to ammonia water, any conventionally known one can be utilized. For example, sodium hydroxide, potassium hydroxide, etc. can be illustrated, but the invention is not limited to these in any way.

The temperature at the first step (liquid temperature; slurry temperature) may be adjusted to 0° C. to 100° C. Room temperature (as standing in the non-heated state) is also possible, but by adjustment to a high temperature of preferably 60 to 100° C., more preferably 80 to 100° C., the zirconium hydroxide is aged. Due to this, the specific surface area of the CZ-based composite oxide after the durability test becomes higher, so the oxide may be warmed if necessary.

At the second step, an acidic solution which contains cerium ions is added and mixed with the zirconium hydroxide slurry which is obtained at the first step so that the chemical composition of the finished product CZ-based composite oxide becomes, by mass ratio, zirconia: 30% to 80%, a total of oxides of one or more third elements selected from yttrium and rare earth elements having atomic number 57 to 71 (except cerium and promethium): 0% to 20%, and a balance of ceria and unavoidable impurities. At this step, the majority of the rare earth ions which are added by the ion exchange ability of the zirconium hydroxide slurry is uniformly adsorbed and immobilized at the zirconium hydroxide.

The second step has to be performed while adjusting the pH of the reaction system to 4 to 8, preferably 5 to 7, more preferably 6 to 7, and the temperature (liquid temperature) to 0° C. to 100° C. By adjusting the pH to the above range, it becomes possible to promote the adsorption and immobilization of the added cerium ions or added third element ions to the zirconium hydroxide. By a single operation, it is possible to make the cerium ions or third element ions be efficiently adsorbed. When the pH is higher than 8, the total amount of the cerium ions or third element ions ends up precipitating as hydroxides immediately after they are added to the zirconium hydroxide slurry. The obtained product becomes just a random mixture of zirconium hydroxide and cerium hydroxide or third element hydroxides. The problem arises that the solid solution of the oxides obtained by the firing operation becomes insufficient. On the other hand, if the pH is less than 4, the adsorption-immobilization becomes harder to proceed, and unadsorbed cerium ions or third element ions become the majority. What is obtained by neutralizing such a slurry over pH 8 is just a random mixture of zirconium hydroxide and cerium hydroxide or third element hydroxides. A solid solution is insufficiently formed by the firing.

The temperature of the reaction system in the second step (liquid temperature) may, after the first step, be adjusted to 0° C. to 100° C.

The present invention is characterized by controlling the slurry of the reaction system to pH 4 to 8 in the second step while adding the cerium ions or third element ions so as to cause the cerium ions or rare earth ions to be adsorbed and immobilized on the surface of the zirconium hydroxide without causing the cerium ions or third element ions to precipitate as hydroxides. By diffusion by the subsequent firing, a single solid-solution phase CZ-based composite oxide is obtained. Note that, the condition of the pH 4 to 8 may be achieved any time before the start of the third step after adding the entire amount of the acidic solution which contains cerium ions or third element ions. The CZ-based composite oxide which is produced via the step of controlling the pH so as to be 4 to 8 to cause cerium ions or third element ions uniformly to be adsorbed on the surface of the zirconium hydroxide in this way is characterized by being provided with a pore distribution reflecting the pore characteristics of zirconium hydroxide and by having a small change (b/a) of mode pore diameter before and after the durability test and/or a small change (d/c) of pore volume before and after the durability test, that is, being excellent as an automotive exhaust gas catalytic promoter.

The acidic solution which contains cerium ions which is used at the second step may further contain third element ions (except cerium and promethium). That is, the acidic solution which contains cerium ions may further contain one or more elements which are selected from third elements of yttrium and rare earth elements having atomic number 57 to 71 (except cerium and promethium) in the form of ions of these elements in a ratio of 0% to 20% converted to mass ratio of oxides in the CZ-based composite oxide (finished product). In this case, the amount of ceria is adjusted so that oxide contains, by mass ratio, zirconia: 30% to 80%, a total of oxides of the third elements: 0% to 20%, and a balance of ceria and unavoidable impurities. When the third element ions are made to be included in a ratio, by mass ratio, exceeding 20% converted to mass ratio of oxides in the CZ-based composite oxide (finished product), the oxides of the third elements (rare earth elements) will be excessively added, so this is uneconomical. Further, for example, as shown in Example 1-2, Test No. 8 (comparative example), after the durability test, the CZ-based composite oxide becomes poor in solid solution, so this is not preferable.

As this acidic solution which contains cerium ions (or third element ions), for example, a cerium chloride solution etc. may be illustrated, but the invention is not limited to these. These may be used as single types alone or as two types or more combined. From the viewpoint of reducing the cost of wastewater treatment, the solution is preferably a cerium chloride solution etc.

At the third step, after the second step, an alkali is further added to the zirconium hydroxide slurry at which the cerium ions or the third element ions are adsorbed to make the pH rise to over 8 to 12 so as to completely immobilize the cerium ions or third element ions which are adsorbed at the zirconium hydroxide as hydroxides and, further, cause the unabsorbed cerium ions or third element ions to precipitate as hydroxides. Specifically, the slurry obtained at the second step is stirred while adding an alkali solution and made to rise in pH to a predetermined value so as to cause the cerium ions or third element ions which remain in the solution to precipitate as hydroxides. If the pH at this step is 8 or less, precipitation does not proceed. Note that, there is no need to add an uneconomical amount of alkali, so the pH may be made 12 or less.

Here, as the alkali (solution), a conventionally known one can be used. For example, ammonia, sodium hydroxide, potassium hydroxide, etc. can be mentioned, but the invention is not limited to these in any way.

At the fourth step, the hydroxides which were obtained at the third step (mixed slurry of cerium-zirconium-based hydroxides) are filtered and washed to obtain a cerium-zirconium-based hydroxide cake. The means for such a solid-liquid separation operation is not particularly an issue. A centrifugal separation apparatus, filter apparatus, or other industrially used apparatus may be used. For example, as is generally known, the slurry can be suction filtered by a Nutsche filter or other filter apparatus to obtain a cake. Further, the washing operation needs only sufficiently to decrease the chloride ions and other miscellaneous ions from the cerium-zirconium-based hydroxide mixed slurry. For example, it may be performed by making a solid disperse in pure water, then using a centrifugal separation apparatus or filter apparatus.

At the fifth step, the cerium-zirconium-based hydroxide cake obtained at the fourth step is dried, then fired to obtain the CZ-based composite oxide. The drying operation is performed using an industrial use external heat type or internal heat type drying apparatus at a drying temperature of 60 to 200° C. or so to thereby decrease the amount of moisture which adheres to the solids. After the drying operation, a firing operation is performed. The firing temperature can be suitably selected in accordance with need, but is practically 400 to 1000° C., preferably 500 to 900° C., more preferably 600 to 900° C. in range. If the firing temperature is 400° C. or more, the hydroxides become oxides and a ceria-zirconia composite oxide is formed. This is desirable from this viewpoint. Further, a firing temperature of 1000° C. or less is preferable from the viewpoint of the operating costs of the firing furnace. In the examples, as one example, the oxide is fired in the air atmosphere (in the atmosphere) at 700° C. for 3 hours, but the firing temperature and firing time and the atmosphere at the time of firing are not limited. Note that, the drying operation and the firing operation may also be made respectively independent operations, but may also be performed as a series of successive operations.

Due to the firing operation, the cerium-zirconium-based hydroxide is stripped of water and becomes a CZ-based composite oxide. The CZ-based composite oxide obtained in this way is crushed if necessary to adjust the particle size. The crushing need only be able to adjust the particle size to the desired size and may be performed by a stamp mill, roller mill, jet mill, ball mill, or other mill which is used industrially.

The basic production process of the CZ-based composite oxide according to the present invention is as follows, but in particular, in the method of production of a CZ-based composite oxide of the present invention, before the first step, the step of adding a peroxodisulfate or a sulfate to a hydrochloric acid solution containing zirconium oxychloride to cause precipitation and then adding an alkali to it so as to obtain zirconium hydroxide (also referred to as zirconium hydroxide forming step) is preferably performed. At this zirconium hydroxide forming step, if adding to a hydrochloric acid solution containing zirconium oxychloride a peroxodisulfate such as ammonium peroxodisulfate, in a range of from 0.20 to 1.50 moles converted to sulfuric acid ions with respect to 1 mole of zirconium in the hydrochloric acid solution containing zirconium oxychloride and heating at 60 to 100° C., preferably 70 to 100° C., more preferably 80 to 100° C. in range, a zirconium-based precipitate is formed along with the quick, uniform decomposition of the peroxodisulfate. If the heating temperature is 60° C. or more, quick formation of a uniform sulfate precipitate is promoted, so this is preferable on this point. The heating temperature is set 100° C. or less since quick formation of a uniform sulfate precipitate is promoted and also treatment such as an autoclave is unnecessary. By treating the precipitate obtained in this way by an alkali to obtain a hydroxide (zirconium hydroxide) and using this for the succeeding first step and on (for example, the second step of causing the adsorption of cerium ions or third element ions etc.), a CZ-based composite oxide which has the characteristic of a small change (d/c) in the pore volume before and after a durability test at a high temperature which heats the oxides in the atmosphere under a temperature condition of 1100° C. for 5 hours is obtained. This is superior on this point. The reason why a process including this zirconium hydroxide forming step enables a CZ-based composite oxide with a small change (d/c) of pore volume before and after the above-mentioned high temperature durability test is believed to be as follows. That is, the zirconium hydroxide obtained from the zirconium-based precipitates which are produced along with the decomposition of the peroxodisulfate has a large pore volume and, further, the operation of raising the pH, which comprises the succeeding adsorption of cerium ions or third element ions and addition of alkali, causes cerium hydroxide and third element hydroxides to be formed uniformly at the surface of the zirconium hydroxide without the pores being crushed much, so the pore volume becomes greater even after firing and, further, even after a high temperature durability test, there is resistance to sintering among secondary particles, so the pore volume is made less susceptible to crushing by sintering.

The content of the peroxodisulfate is, by sulfuric acid ions, 0.20 mole or more per 1 mole of zirconium in a hydrochloric acid solution which contains zirconium oxychloride, more preferably 0.30 to 1.50 mole in range. If the content of the peroxodisulfate is less than 0.20 mole converted to sulfuric acid ions with respect to 1 mole of zirconium, the effect of addition is not sufficiently exhibited and the pore volume becomes smaller. On the other hand, if the content of the peroxodisulfate exceeds 1.50 moles converted to sulfuric acid ions with respect to 1 mole of zirconium, the specific surface area after the above-mentioned high temperature durability test, which is important as a characteristic of a CZ-based composite oxide, becomes smaller. If the content of the peroxodisulfate is in this range, the greater the amount of addition of the peroxodisulfate, the more improved the (d/c) is like in the examples.

Here, the peroxodisulfate is not particularly limited. For example, ammonium peroxodisulfate, sodium peroxodisulfate, potassium peroxodisulfate, etc. may be illustrated, but the invention is not limited to these in any way. These may be used as single types alone or two or more types may be jointly used.

Further, instead of a peroxodisulfate, a sulfate may also be used. In this case, a hydrochloric acid solution containing zirconium oxychloride may be heated to 50 to 100° C., preferably 60 to 100° C., more preferably 70 to 100° C. in range, then, for example, ammonium sulfate may be added. If the heating temperature is 50° C. or more, quick formation of a uniform sulfate precipitate is promoted, so this is preferable on this point. The heating temperature is set to 100° C. or less since quick formation of a uniform sulfate precipitate is promoted and also treatment by an autoclave etc. is unnecessary.

As the content of the sulfate, it is desirable to set the content to 0.20 mole or more in equivalent amount of sulfuric acid ions with respect to 1 mole of zirconium in the hydrochloric acid solution containing zirconium oxychloride, preferably 0.20 to 1.50 moles, more preferably 0.30 to 1.50 moles in range. If the content of the sulfate is less than 0.20 mole with respect to 1 mole of zirconium, the effect of addition cannot be sufficiently exhibited and the pore volume becomes smaller. On the other hand, if the content of sulfate exceeds 1.50 moles with respect to 1 mole of zirconium, the specific surface area after the above-mentioned durability test at the high temperature, which is important as a characteristic of a CZ-based composite oxide, becomes smaller. If the content of the sulfate is in this range, the larger the amount of addition of the sulfate, the better the (d/c).

Here, the sulfate is not particularly limited. For example, ammonium sulfate, sodium sulfate, potassium sulfate, etc. may be illustrated, but the invention is not limited to these in any way. These may be used as single types alone or two or more types may be jointly used.

Further, the alkali which is added after causing precipitation using the peroxodisulfate or sulfate is not particularly limited. For example, ammonia, sodium hydroxide, potassium hydroxide, etc. may be mentioned, but the invention is not limited to these in any way. These may be used as single types alone or two types or more may be jointly used.

Further, in the method of production of a CZ-based composite oxide of the present invention, at the first step, the zirconium hydroxide slurry can contain 40% or less of the cerium ions and third element ions added at the second step, converted to content of oxides in the CZ-based composite oxide forming the finished product, by mass ratio, as their hydroxides. Such hydroxides, for example, can be prepared by using the method of production which is described in Japanese Patent No. 4928931. Due to this, it is possible to, in the succeeding second step, cause the cerium ions or third element ions which are adsorbed at the surface of the zirconium hydroxide containing the cerium hydroxide and/or third element hydroxides and the cerium ions or third element ions which are introduced in the first step to diffuse uniformly and highly by firing and form a much better solid solution state.

EXAMPLES

Below, examples and comparative examples will be used to explain the present invention, but the present invention is not limited to these. The "%" which is used below is "mass %" unless otherwise indicated. The "%" which is used in terms of the zirconia, ceria, and third element is "mass %" of the mass of the corresponding oxides in the CZ-based composite oxide forming the finished product.

Example 1-1

An aqueous solution of 1 liter which contains zirconium oxychloride in the amount which is 35 g worth of zirconium was prepared. Ammonium peroxodisulfate was added to 15 g/liter. While stirring, the mixture was heated to 95° C. to cause precipitation, then ammonia water was added to make the pH 9. After filtration, 2% ammonia water of 1 liter was used for repulping washing three times to obtain zirconium hydroxide (zirconium hydroxide forming step).

To the thus obtained 35 g of zirconium hydroxide converted to zirconia, 500 g of pure water was added to prepare pH 10 zirconium hydroxide slurry and raise it to 80° C. in temperature (first step).

The obtained zirconium hydroxide slurry was held at 80° C. To this, a room temperature hydrochloric acid solution of 150 g which contains cerium oxide of 10 g, lanthanum oxide of 1 g, praseodymium oxide of 2 g, and neodymium oxide of 2 g was added by a tube pump and, while stirring, were caused to be adsorbed at the zirconium hydroxide. The pH at the time of completion of addition was 6.5. The adsorption rate of the cerium ions, lanthanum ions, praseodymium ions, and neodymium ions on the zirconium hydroxide (these also being referred to as "rare earth ions") was 95% or more (second step).

To the zirconium hydroxide slurry which was obtained at the second step and to which the cerium ions and other rare earth ions were caused to be adsorbed, an alkali constituted by ammonia water was added and the pH was adjusted to 10. As a result, the rare earth ions which were not adsorbed at the zirconium hydroxide at the second step all precipitated as hydroxides (third step). This was confirmed from the fact that any cerium ions, lanthanum ions, praseodymium ions, or neodymium ions (rare earth ions) were not detected from the filtrate which was obtained in the following fourth step.

The hydroxides slurry which was obtained at the third step was filtered by a Nutsche filter and the obtained hydroxides were repulped using 2% ammonia water of 1 liter three times to obtain a cerium-zirconium-based hydroxide cake (fourth step).

The hydroxide cake which was obtained at the fourth step was dried at 120° C., then was pulverized by a mortar, and was fired in the atmosphere at 700° C. for 3 hours to obtain the CZ-based composite oxide (fifth step).

Figure 3:
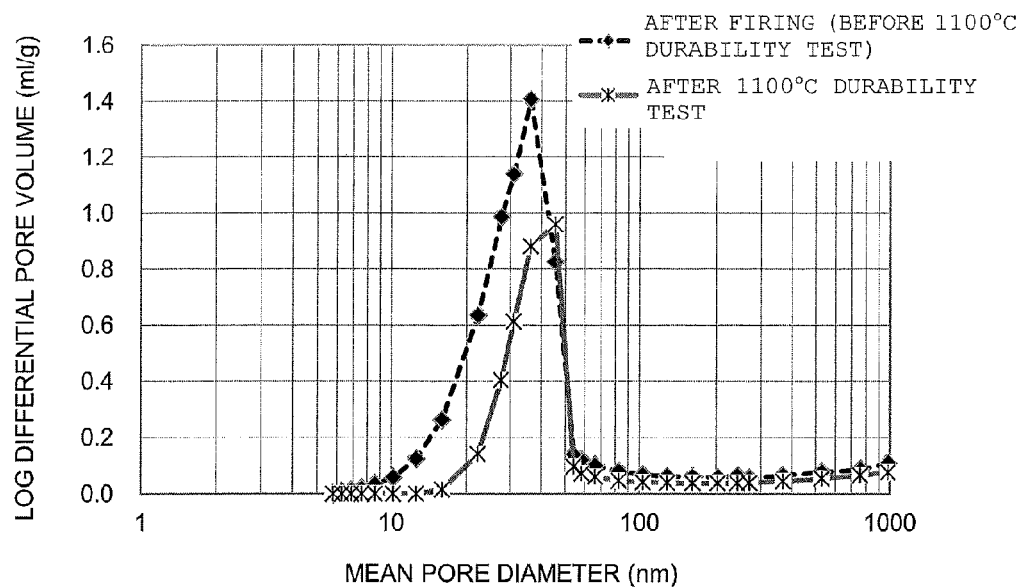
FIG. 3 is a chart of XRD which shows the state of pore distribution of a CZ-based composite oxide according to Test No. 1 (invention example) of Example 1-1. The solid line is the chart after a durability test which heats the oxide at 1100° C. for 5 hours, the broken line is the chart after firing at 700° C. (before 1100° C. durability test).

The XRD patterns of the CZ-based composite oxide obtained at the fifth step in the states after firing at 700° C. (before 1100° C. durability test) and after a durability test which heats the oxide in the atmosphere at a temperature condition of 1100° C. for 5 hours are as shown in FIG. 1. The fact of being a single solid-solution phase was shown. The values of other properties are as shown in Table 1. The ratio of mode pore diameters (b/a) of Table 1 is the ratio (b/a) of the mode pore diameter (b) of pore distribution after a durability test which heats the oxide in the atmosphere at a temperature condition of 1100° C. for 5 hours to the mode pore diameter (a) before the durability test. The evaluation criteria are as follows: FIG. 3 shows the relationship between the mean pore diameters before and after the durability test and the Log differential pore volume. Further, the ratio of pore volumes (d/c) of Table 1 is the ratio (d/c) of the pore volume (d) after a durability test which heats the oxide in the atmosphere at a temperature condition of 1100° C. for 5 hours to the pore volume (c) before the =durability test. The evaluation criteria were as follows:

Evaluation Criteria of Ratio (b/a) of Mode pore diameters
VG (very good): $1.0 \leq (b/a) \leq 1.3$G
G (good): $1.3 < (b/a) \leq 1.5$
F (fair): $1.5 < (b/a) \leq 2.0$
P (poor): $2.0 < (b/a)$
Evaluation Criteria of Ratio (d/c) of Pore Volumes
VG (very good): $0.50 \leq (d/c) \leq 1.00$
G (good): $0.35 \leq (d/c) < 0.50$
F (fair): $0.20 \leq (d/c) < 0.35$
P (poor): $0.00 \leq (d/c) < 0.20$

TABLE 1

| Test No. | 1 (invention example) |
|---|---|
| Ceria (mass %) | 20 |
| Zirconia (mass %) | 70 |
| Third elements (mass %) (as oxides) | $La_2O_3$: 2, $Pr_6O_{11}$: 4, $Nd_2O_3$: 4, total: 10 |
| pH of second step | 6.5 |
| BET specific surface area after 1100° C. durability test (m$^2$/g) | 24 |
| Mode pore diameter (a) after firing (before 1100° C. durability test) (nm) | 36 |
| Mode pore diameter (b) after 1100° C. durability test (nm) | 46 |
| Ratio (b/a) of mode pore diameters | 1.3 evaluation: VG |
| Pore volume (c) after firing (before 1100° C. durability test) (ml/g) | 0.51 |
| Pore volume (d) after 1100° C. durability test (ml/g) | 0.27 |
| Ratio (d/c) of pore volumes | 0.53 evaluation: VG |

Example 1-2

A CZ-based composite oxide which has the chemical components which are shown in Table 2 was prepared based on Example 1-1. The values of the properties of the CZ-based composite oxide which form the obtained finished product are shown in Table 3.

The evaluation criteria of the solid solution state after firing (before 1100° C. durability test) and the solid solution state after the 1100° C. durability test of Table 3 were as follows:

G (good): single solid-solution phase

P (poor): phases other than solid-solution phase observed

Further, the ratio (b/a) of mode pore diameters in Table 3 is the ratio (b/a) of the mode pore diameter (b) of pore distribution after a durability test which heats the oxide in the atmosphere at a temperature condition of 1100° C. for 5 hours to the mode pore diameter (a) before the durability test. The evaluation criteria were similar to the evaluation criteria which are shown in Table 1. Further, the ratio (d/c) of pore volumes in Table 3 is the ratio (d/c) of the pore volume (d) after a durability test which heats the oxide in the atmosphere at a temperature condition of 1100° C. for 5 hours to the pore volume (c) before the durability test. The evaluation criteria were similar to the evaluation criteria which are shown in Table 1.

TABLE 2

| Test no. | Ceria (mass %) | Zirconia (mass %) | Third elements (mass %) (as oxides) | Remarks |
|---|---|---|---|---|
| 2 | 30 | 70 | — | Inv. ex. |
| 3 | 30 | 60 | $Y_2O_3$: 4, $La_2O_3$: 2, $Nd_2O_3$: 4, total: 10 | Inv. ex. |
| 4 | 60 | 30 | $Y_2O_3$: 5, $Gd_2O_3$: 5, total: 10 | Inv. ex. |
| 5 | 45 | 40 | $Y_2O_3$: 7, $La_2O_3$: 8, total: 15 | Inv. ex. |
| 6 | 50 | 30 | $Y_2O_3$: 8, $La_2O_3$: 7, $Pr_6O_{11}$: 5, total: 20 | Inv. ex. |
| 7 | 15 | 80 | $Gd_2O_3$: 3, $La_2O_3$: 2, total: 5 | Inv. ex. |
| 8 | 15 | 60 | $Y_2O_3$: 5, $La_2O_3$: 20, total: 25 | Comp. Ex. |

TABLE 3

| Test No. | Solid solution state after firing (before 1100° C. durability test) | Solid solution state after 1100° C. durability test | BET specific surface area after 1100° C. durability test (m²/g) | Mode pore diameter (a) after firing (before 1100° C. durability test) (nm) | Mode pore diameter (b) after 1100° C. durability test (nm) | Ratio (b/a) of mode pore diameters | Remarks | | Pore volume (c) after firing (before 1100° C. durability test) (ml/g) | Pore volume (d) after 1100° C. durability test (ml/g) | Ratio (d/c) of pore volumes | |
|---|---|---|---|---|---|---|---|---|---|---|---|---|
| 2 | G | G | 20 | 32 | 41 | 1.3 | VG | Inv. ex. | 0.32 | 0.24 | 0.75 | VG |
| 3 | G | G | 27 | 22 | 31 | 1.4 | G  | Inv. ex. | 0.50 | 0.29 | 0.58 | VG |
| 4 | G | G | 23 | 46 | 54 | 1.2 | VG | Inv. ex. | 0.41 | 0.27 | 0.66 | VG |
| 5 | G | G | 25 | 28 | 31 | 1.1 | VG | Inv. ex. | 0.48 | 0.29 | 0.60 | VG |
| 6 | G | G | 26 | 16 | 31 | 1.9 | F  | Inv. ex. | 0.47 | 0.30 | 0.64 | VG |
| 7 | G | G | 21 | 28 | 46 | 1.6 | F  | Inv. ex. | 0.29 | 0.21 | 0.72 | VG |
| 8 | G | P | 19 | 16 | 28 | 1.8 | F  | Comp. Ex. | 0.57 | 0.34 | 0.60 | VG |

Example 1-3

A CZ-based composite oxide which has the chemical components of Test No. 1 of Example 1-1 was caused to change in the pH value of the second step by adjusting the concentration of the hydrochloric acid solution and thereby the CZ-based composite oxide was obtained. The values of the properties of the obtained CZ-based composite oxide which form the finished product are shown in Table 4.

Figure 2:
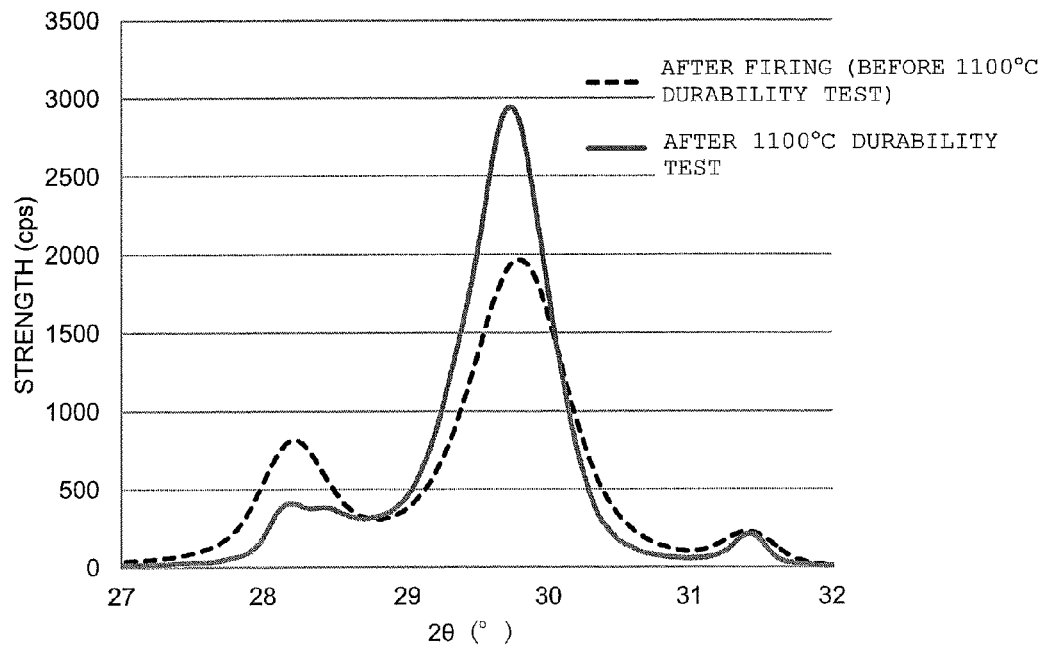
FIG. 2 is a chart of XRD from 2θ:27° to 32° of a CZ-based composite oxide according to Test No. 15 (comparative example) of Example 1-3. The solid line is the chart after a durability test which heats the oxide at 1100° C. for 5 hours, while the broken line is the chart after firing at 700° C. (before 1100° C. durability test).

FIG. 2 shows the XRD charts before and after the durability test of Test No. 15.

Further, the ratio (b/a) of mode pore diameters of Table 4 is the ratio (b/a) of the mode pore diameter (b) of pore distribution after a durability test which heats the oxide in the atmosphere at a temperature condition of 1100° C. for 5 hours to the mode pore diameter (a) before the durability test. The evaluation criteria were similar to the evaluation criteria which are shown in Table 1. Further, the ratio (d/c) of pore volumes of Table 4 is the ratio (d/c) of the pore volume (d) after a durability test which heats the oxide in the atmosphere at a temperature condition of 1100° C. for 5 hours to the pore volume (c) before the durability test. The evaluation criteria were similar to the evaluation criteria which are shown in Table 1.

The evaluation criteria of the solid solution state after firing (before 1100° C. durability test) and the solid solution state after the 1100° C. durability test of Table 4 were as follows.

G (good): single solid-solution phase
P (poor): phases other than solid-solution phase observed As clear from the Examples 1-1 to 1-3, the CZ-based composite oxide according to the present invention shows a single solid-solution phase in the X-ray diffraction pattern after a durability test which heats the oxide in the atmosphere at a temperature condition of 1100° C. for 5 hours, has a high specific surface after after the durability test, and, further, shows a ratio (b/a) of a mode pore diameter (a) of pore distribution after a durability test which heats the oxide in the atmosphere at a temperature condition of 1100° C. for 5 hours to the mode pore diameter (b) before the durability test of a low value of 2.0 or less. Further, it shows a ratio (d/c) of a pore volume (d) after a durability test which heats the oxide in the atmosphere at a temperature condition of 1100° C. for 5 hours to the pore volume (c) before the durability test of 0.20 to 1.00 in value Example 2-1

An aqueous solution: 1 liter which contains zirconium oxychloride in the amount which is 30 g worth of zirconia and cerium chloride in the amount which is 5 g worth of ceria was prepared, ammonium peroxodisulfate was added to 15 g/liter, and, while stirring, the mixture was heated to 95° C. and made to precipitate, then ammonia water was added to render the pH 9, the result was filtered, then repulped using 2% ammonia water of 1 liter three times to obtain cerium zirconium hydroxide (cerium zirconium hydroxide forming step).

To 35 g of the cerium zirconium hydroxide converted to ceria-zirconia, 500 g of pure water was added to prepare a pH 10, liquid temperature 20° C. cerium zirconium hydroxide slurry (first step).

TABLE 4

| Test no. | pH of second step | Solid solution state after firing (before 1100° C. durability test) | Solid solution state after 1100° C. durability test | BET specific surface area after 1100° C. durability test (m²/g) | Mode pore diameter (a) after firing (before 1100° C. durability test) (nm) | Mode pore diameter (b) after 1100° C. durability test (nm) | Ratio (b/a) of mode pore diameters | Remarks | | Pore volume (c) after firing (before 1100° C. durability test) (ml/g) | Pore volume (d) after 1100° C. durability test (ml/g) | Ratio (d/c) of pore volumes | |
|---|---|---|---|---|---|---|---|---|---|---|---|---|---|
| 9  | 3.5 | P | P | 17 | 16 | 36 | 2.3 | P  | Comp. Ex. | 0.29 | 0.09 | 0.31 | F  |
| 10 | 4.5 | G | G | 20 | 31 | 46 | 1.5 | G  | Inv. ex.  | 0.41 | 0.16 | 0.39 | G  |
| 11 | 5.0 | G | G | 25 | 36 | 46 | 1.3 | VG | Inv. ex.  | 0.49 | 0.27 | 0.55 | VG |
| 12 | 6.0 | G | G | 26 | 36 | 46 | 1.3 | VG | Inv. ex.  | 0.50 | 0.26 | 0.52 | VG |
| 13 | 7.0 | G | G | 23 | 36 | 46 | 1.3 | VG | Inv. ex.  | 0.49 | 0.25 | 0.51 | VG |
| 14 | 7.5 | G | G | 22 | 36 | 46 | 1.3 | VG | Inv. ex.  | 0.39 | 0.19 | 0.49 | G  |
| 15 | 8.5 | P | P | 11 | 13 | 28 | 2.2 | P  | Comp. Ex. | 0.16 | 0.03 | 0.19 | P  |

To the obtained cerium zirconium hydroxide slurry, a room temperature hydrochloric acid solution of 150 g which contains cerium oxide of 10 g, lanthanum oxide of 2.5 g and yttrium oxide of 2.5 g worth of ions was added using a tube pump. While stirring, the ions were caused to be adsorbed at the cerium zirconium hydroxide. The pH at the time of completion of addition was 6.5 (second step).

To the cerium zirconium hydroxide slurry which was obtained at the second step and to which cerium ions and other rare earth ions were adsorbed, an alkali constituted by ammonia water was added to adjust the pH to be 10. As a result, all of the rare earth ions which were not adsorbed at the cerium zirconium hydroxide at the second step precipitated as hydroxides (third step).

The hydroxide slurry which was obtained at the third step was filtered by a Nutsche filter, then the obtained hydroxides were repulped using 2% ammonia water of 1 liter three times to obtain a cerium-zirconium-based hydroxide cake (fourth step).

The hydroxide cake which was obtained at the fourth step was dried at 120° C., then crushed, then was fired in the atmosphere at 700° C. for 3 hours to obtain the CZ-based composite oxide (fifth step).

Figure 7:
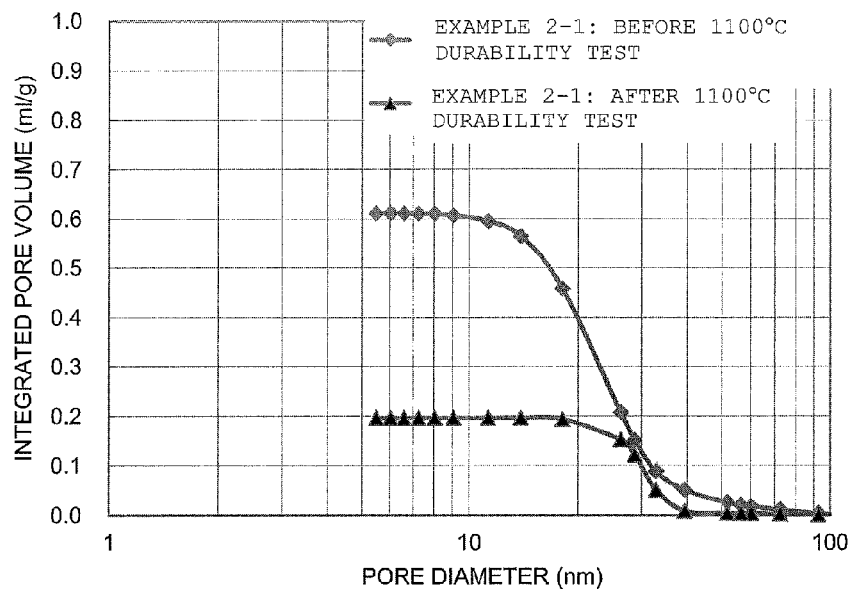
FIG. 7 is a graph which shows the relationship of a pore diameter and cumulative pore volume of a CZ-based composite oxide of Example 2-1 before and after a durability test which heats the oxide at a temperature condition of 1100° C. for 5 hours.

The composition of the CZ-based composite oxide which was obtained by the fifth step was shown in Table 5. Further, the characteristics of the obtained CZ-based composite oxide, that is, the pore characteristics and solid solution states in the states after 700° C. firing (before 1100° C. durability test) and after a durability test which heats the oxide in the atmosphere at a temperature condition of 1100° C. for 5 hours, were as shown in Table 6. The specific surface area after the 1100° C. durability test was 29 $m^2/g$. Further, FIG. 7 shows a graph which shows the relationship between the pore diameter and cumulative pore volume of the CZ-based composite oxide of Example 2-1 before and after the 1100° C. 5-hour durability test. FIG. 8 is a graph which shows the relationship between the mean pore diameter and Log differential pore volume of the CZ-based composite oxide of Example 2-1 before and after the 1100° C. 5-hour durability test.

Example 2-2

Except for setting the amount of addition of ammonium peroxodisulfate in the step of forming the cerium zirconium hydroxide to 18 g/liter, the same procedure was followed as the procedure shown in Example 2-1 to prepare a CZ-based composite oxide.

The composition of the obtained CZ-based composite oxide was as shown in Table 5. Further, the pore characteristics and solid solution states of the obtained CZ-based composite oxide in the states after firing at 700° C. (before 1100° C. durability test) and after a durability test which heats the oxide in the atmosphere at a temperature condition of 1100° C. for 5 hours were as shown in Table 6. The specific surface area after the 1100° C. durability test was 27 $m^2/g$.

Example 2-3

Except for setting the amount of addition of the ammonium peroxodisulfate to 30 g/liter at the step of forming cerium zirconium hydroxide, the same procedure was followed as the procedure shown in Example 2-1 to prepare a CZ-based composite oxide.

The composition of the obtained CZ-based composite oxide was as shown in Table 5. Further, the pore character- istics and solid solution states in the states after firing at 700° C. of the obtained CZ-based composite oxide (before 1100° C. durability test) and after a durability test which heats the oxide in the atmosphere at a temperature condition of 1100° C. for 5 hours were as shown in Table 6. The specific surface area after the 1100° C. durability test was 22 $m^2/g$.

Comparative Example 2-1

Zirconium oxynitrate corresponding to zirconia of 3.0 g, ceria of 1.5 g, lanthanum oxide of 0.10 g, neodymium oxide of 0.20 g, and yttrium oxide of 0.20 g were dissolved in a nitric acid aqueous solution of 50 ml and the solution was adjusted by ammonia water to pH 10. The obtained hydroxide slurry was placed in a pressure resistant container and sealed, then was aged by heating at 150° C. for 5 hours. The container was unsealed, then the slurry was filtered, then was dried at 120° C., then was fired at 700° C. for 3 hours to obtain the CZ-based composite oxide.

The composition of the obtained CZ-based composite oxide is shown in Table 5. Further, the characteristics of the obtained CZ-based composite oxide, that is, the pore characteristics and solid solution states in the states after 700° C. firing (before 1100° C. durability test) and after a durability test which heats the oxide in the atmosphere at a temperature condition of 1100° C. for 5 hours, were as shown in Table 6. The specific surface area after the 1100° C. durability test was 12 $m^2/g$.

Comparative Example 2-2

Zirconium oxynitrate corresponding to zirconia of 2.00 g, ceria of 2.75 g, and neodymium oxide of 0.25 g were dissolved in a nitric acid aqueous solution of 50 ml and the solution was adjusted by ammonia water to pH 10. The obtained hydroxide slurry was placed in a pressure resistant container and sealed, then was aged by heating at 150° C. for 5 hours. The container was unsealed, then the slurry was filtered, then was dried at 120° C., then was fired at 700° C. for 3 hours to obtain the CZ-based composite oxide.

The composition of the obtained CZ-based composite oxide was shown in Table 5. Further, the characteristics of the obtained CZ-based composite oxide, that is, the pore characteristics and solid solution states in the states after 700° C. firing (before 1100° C. durability test) and after a durability test which heats the oxide in the atmosphere at a temperature condition of 1100° C. for 5 hours, were as shown in Table 6. The specific surface area after the 1100° C. durability test was 7 $m^2/g$.

Comparative Example 2-3

A hydrochloric acid aqueous solution of 1 liter containing zirconium oxychloride whose amount converted to zirconia was 30 g and cerium chloride whose amount converted to ceria was 20 g was made pH 10 using ammonia water, the slurry was filtered, then 2% ammonia water of 1 liter was used to repulp it three times, and the slurry was dried at 120° C., then was fired at 700° C. for 3 hours to obtain the CZ-based composite oxide.

The composition of the obtained CZ-based composite oxide was shown in Table 5. Further, after firing at 700° C. (before 1100° C. durability test) of the obtained CZ-based composite oxide, there were almost no pores. Further, there were no pores at all in the state after a durability test which heats the oxide in the atmosphere at a temperature condition of 1100° C. for 5 hours. The mode pore diameter (a) before a durability test which heats the oxide in the atmosphere at a temperature condition of 1100° C. for 5 hours, the mode pore diameter (b) of pore distribution after a durability test, the pore volume (c) before the durability test, and the pore volume (d) after the durability test were as shown in Table 6. The specific surface area after the 1100° C. durability test was 1 m²/g.

Further, the ratio (b/a) of mode pore diameters of Table 6 is the ratio (b/a) of the mode pore diameter (b) of pore distribution after a durability test which heats the oxide in the atmosphere at a temperature condition of 1100° C. for 5 hours to the mode pore diameter (a) before the durability test. The evaluation criteria were similar to the evaluation criteria which are shown in Table 1. Further, the ratio (d/c) of pore volumes of Table 6 is the ratio (d/c) of the pore volume (d) after a durability test which heats the oxide in the atmosphere at a temperature condition of 1100° C. for 5 hours to the pore volume (c) before the durability test. The evaluation criteria were similar to the evaluation criteria which are shown in Table 1.

The evaluation criteria of the solid solution state after firing (before 1100° C. durability test) and the solid solution state after the 1100° C. durability test of Table 6 were as follows.

G (good): single solid-solution phase
P (poor): phases other than solid-solution phase observed Examples 2-4 to 2-8

CZ-based composite oxides (samples) of Examples 2-4 to 2-8 which have the chemical components which are shown in Table 7 were prepared based on Example 2-1. The values of the properties of the CZ-based composite oxides (samples) of Examples 2-4 to 2-8 which form the finished products are shown in Table 8. FIG. 9 shows a graph which shows the relationship between the mean pore diameter of the CZ-based composite oxide and the Log differential pore volume regarding Example 2-8 before and after the 1100° C. 5-hour durability test.

Further, the ratio (b/a) of mode pore diameters of Table 8 is the ratio (b/a) of the mode pore diameter (b) of pore distribution after a durability test which heats the oxide in the atmosphere at a temperature condition of 1100° C. for 5 hours to the mode pore diameter (a) before the durability test. The evaluation criteria were similar to the evaluation criteria which are shown in Table 1. Further, the ratio (d/c) of pore volumes of Table 8 is the ratio (d/c) of the pore volume (d) after a durability test which heats the oxide in the atmosphere at a temperature condition of 1100° C. for 5 hours to the pore volume (c) before the durability test. The evaluation criteria were similar to the evaluation criteria which are shown in Table 1.

The evaluation criteria of the solid solution state after firing (before 1100° C. durability test) and the solid solution state after the 1100° C. durability test shown in Table 8 were as follows.

G (good): single solid-solution phase
P (poor): phases other than solid-solution phase observed

TABLE 5

| | Ceria (mass %) | Zirconia (mass %) | Third elements (mass %) (as oxides) | Amount of addition of ammonium peroxodisulfate (g/liter) |
|---|---|---|---|---|
| Ex. 2-1 | 30 | 60 | $Y_2O_3$: 5, $La_2O_3$: 5, total: 10 | 15 |
| Ex. 2-2 | 30 | 60 | $Y_2O_3$: 5, $La_2O_3$: 5, total: 10 | 18 |
| Ex. 2-3 | 30 | 60 | $Y_2O_3$: 5, $La_2O_3$: 5. total: 10 | 30 |
| Comp. Ex. 2-1 | 30 | 60 | $La_2O_3$: 2, $Nd_2O_3$: 4, $Y_2O_3$: 4, total: 10 | 0 (no addition) |
| Comp. Ex. 2-2 | 55 | 40 | $Nd_2O_3$: 5, total: 5 | 0 (no addition) |
| Comp. Ex. 2-3 | 40 | 60 | total: 0 | 0 (no addition) |

TABLE 7

| | Ceria (mass %) | Zirconia (mass %) | Third elements (mass %) (as oxides) | Amount of addition of ammonium peroxodisulfate (g/liter) |
|---|---|---|---|---|
| Ex. 2-4 | 50 | 40 | $Y_2O_3$: 5, $La_2O_3$: 5, total: 10 | 12 |
| Ex. 2-5 | 50 | 40 | $Y_2O_3$: 5, $La_2O_3$: 5, total: 10 | 15 |
| Ex. 2-6 | 50 | 40 | $Y_2O_3$: 5, $La_2O_3$: 5, total: 10 | 18 |
| Ex. 2-7 | 40 | 50 | $La_2O_3$: 3, $Y_2O_3$: 3, $Gd_2O_3$: 4, total: 10 | 15 |
| Ex. 2-8 | 20 | 70 | $La_2O_3$: 2, $Pr_6O_{11}$: 4, $Nd_2O_3$: 4, total: 10 | 18 |

TABLE 6

| | Solid solution state after firing (before 1100° C. durability test) | Solid solution state after 1100° C. durability test | Mode pore diameter (a) after firing (before 1100° C. durability test) (nm) | Mode pore diameter (b) after 1100° C. durability test (nm) | Ratio (b/a) of mode pore diameters | | Pore volume (c) after firing (before 1100° C. durability test) (ml/g) | Pore volume (d) after 1100° C. durability test (ml/g) | Ratio (d/c) of pore volumes | | BET specific surface area after 1100° C. 5-hour durability test (m²/g) |
|---|---|---|---|---|---|---|---|---|---|---|---|
| Ex. 2-1 | G | G | 22 | 31 | 1.4 | G | 0.61 | 0.20 | 0.33 | F | 29 |
| Ex. 2-2 | G | G | 36 | 46 | 1.3 | VG | 0.58 | 0.26 | 0.45 | G | 27 |
| Ex. 2-3 | G | G | 66 | 83 | 1.3 | VG | 0.52 | 0.30 | 0.58 | VG | 22 |
| Comp. Ex. 2-1 | P | P | 13 | 28 | 2.2 | P | 0.25 | 0.05 | 0.20 | F | 12 |
| Comp. Ex. 2-2 | P | P | 9 | 22 | 2.4 | P | 0.26 | 0.04 | 0.15 | P | 7 |
| Comp. Ex. 2-3 | P | P | 8 | No mode diameter | No ratio of mode diameters | P | 0.06 | 0.00 | 0.00 | P | 1 |

TABLE 8

| | Solid solution state after firing (before 1100° C. durability test) | Solid solution state after 1100° C. durability test | Mode pore diameter (a) after firing (before 1100° C. durability test) (nm) | Mode pore diameter (b) after 1100° C. durability test (nm) | Ratio (b/a) of mode pore diameters | | Pore volume (c) after firing (before 1100° C. durability test) (ml/g) | Pore volume (d) after 1100° C. durability test (ml/g) | Ratio (d/c) of pore volumes | | BET specific surface area after 1100° C. 5-hour durability test (m²/g) |
|---|---|---|---|---|---|---|---|---|---|---|---|
| Ex. 2-4 | G | G | 22 | 31 | 1.4 | G | 0.34 | 0.20 | 0.59 | VG | 25 |
| Ex. 2-5 | G | G | 28 | 36 | 1.3 | VG | 0.42 | 0.27 | 0.64 | VG | 25 |
| Ex. 2-6 | G | G | 36 | 46 | 1.3 | VG | 0.46 | 0.31 | 0.67 | VG | 26 |
| Ex. 2-7 | G | G | 28 | 36 | 1.3 | VG | 0.32 | 0.24 | 0.75 | VG | 24 |
| Ex. 2-8 | G | G | 22 | 36 | 1.6 | F | 0.66 | 0.28 | 0.42 | G | 28 |

The invention claimed is:

1. A ceria-zirconia-based composite oxide having a chemical composition, by mass ratio, of zirconia: 30% to 80%, a total of oxides of one or more elements selected from yttrium and rare earth elements having atomic number 57 to 71 (except cerium and promethium): 0% to 20%, and a balance of ceria and unavoidable impurities, said composite oxide being deemed to be a single solid-solution phase in an X-ray diffraction pattern after a durability test which heats the oxide in an atmosphere at a temperature condition of 1100° C. for 5 hours, wherein a ratio (b/a) of a mode pore diameter (b) of a pore distribution after the durability test which heats the oxide in the atmosphere at the temperature condition of 1100° C. for 5 hours to a mode pore diameter (a) before said durability test is 1.0≤b/a≤2.0, wherein the mode pore diameter (a) of the pore distribution before the durability test is in a range of 10 to 70 nm and the mode pore diameter (b) of pore distribution after a durability test is in a range of 20 to 90 nm, and wherein the mode pore diameter of the pore distribution is a mean pore diameter corresponding to a norm in distribution in a distribution chart of a Log differential pore volume for the mean pore diameters in the different sections obtained from measurement of mercury intrusion technique that is performed using a mercury porosimeter.

2. A ceria-zirconia-based composite oxide having a chemical composition, by mass ratio, of zirconia: 30% to 80%, a total of oxides of one or more elements selected from yttrium and rare earth elements having atomic number 57 to 71 (except cerium and promethium): 0% to 20%, and a balance of ceria and unavoidable impurities, said composite oxide being deemed to be a single solid-solution phase in an X-ray diffraction pattern after a durability test which heats the oxide in an atmosphere at a temperature condition of 1100° C. for 5 hours, wherein a ratio (d/c) of a pore volume (d) after a durability test which heats the oxide in the atmosphere at a temperature condition of 1100° C. for 5 hours to a pore volume (c) before said durability test is 0.20≤d/c≤1.00, wherein the pore volume (c) before the durability test is in a range of 0.32 to 1.00 ml/g and the pore value (d) after the durability test is in a range of 0.10 to 0.50 ml/g, and wherein the pore volumes (c) and (d) are pore volumes corresponding to pore diameters in a range of 5.5 to 100 nm which are measured using a mercury porosimeter.

3. The cerin-zirconia-based composite oxide according to claim 1, wherein said ratio (b/a) of the mode pore diameter (b) of a pore distribution after the durability test which heats the oxide in the atmosphere at the temperature condition of 1100° C. for 5 hours to the mode pore diameter (a) before said durability test is 1.0≤(b/a)≤2.0, wherein the mode pore diameter (a) before the durability test is in a range of 10 to 70 nm and the mode pore diameter (b) of the pore distribution after the durability test is in a range of 20 to 90 nm, and wherein a ratio (d/c) of pore volume (d) after the durability test to the pore volume (c) before said durability test is 0.20≤d/c≤1.00.

4. The ceria-zirconia-based composite oxide according to claim 3, wherein the pore volume (d) after the durability test which heats the oxide in the atmosphere at the temperature condition of 1100° C. for 5 hours is 0.10 ml/g or more and the pore volume (c) before said durability test is in a range of 0.20 ml/g or more.

5. The ceria-zirconia-based composite oxide according to any one of claims 1-3, wherein the ceria-zirconia-based composite oxide is obtained by firing at a firing temperature in a range of 400 to 1000° C.

6. The ceria-zirconia-based composite oxide according to any one of claims 1 to 4, wherein a BET specific surface area after the durability test which heats the oxide in the atmosphere at the temperature condition of 1100° C. for 5 hours is 20 m²/g or more.

7. The ceria-zirconia-based composite oxide according to claim 6, wherein a BET specific surface area after the durability test which heats the oxide in the atmosphere at the temperature condition of 1100° C. for 5 hours is not less than 20 m²/g and not more than 29 m²/g.

* * * * *